US012780426B2

(12) United States Patent
Nakamura

(10) Patent No.: US 12,780,426 B2
(45) Date of Patent: Nov. 3, 2026

(54) SAFETY DEVICE AND FLIGHT VEHICLE PROVIDED WITH PARACHUTE HAVING AN UMBRELLA BODY FORMED OF ONE OR MORE GORES

(71) Applicant: NIPPON KAYAKU KABUSHIKI KAISHA, Tokyo (JP)

(72) Inventor: Hiroshi Nakamura, Himeji (JP)

(73) Assignee: NIPPON KAYAKU KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/844,078

(22) PCT Filed: Mar. 30, 2023

(86) PCT No.: PCT/JP2023/013433
§ 371 (c)(1),
(2) Date: Sep. 5, 2024

(87) PCT Pub. No.: WO2023/191013
PCT Pub. Date: Oct. 5, 2023

(65) Prior Publication Data

US 2025/0074605 A1 Mar. 6, 2025

(30) Foreign Application Priority Data

Mar. 31, 2022 (JP) ................................ 2022-061175

(51) Int. Cl.
*B64D 17/80* (2006.01)
*B64D 17/02* (2006.01)
(Continued)

(52) U.S. Cl.
CPC ............ *B64D 17/80* (2013.01); *B64D 17/02* (2013.01); *B64D 17/26* (2013.01); *B64D 17/54* (2013.01);
(Continued)

(58) Field of Classification Search
CPC ......... B64D 17/00; B64D 17/02; B64D 17/10
See application file for complete search history.

(56) References Cited

U.S. PATENT DOCUMENTS 2,134,362 A 10/1938 Frieder
2,426,926 A 9/1947 Frieder et al.
(Continued)

FOREIGN PATENT DOCUMENTS

CN 107600431 A 1/2018

OTHER PUBLICATIONS

International Search Report issued Jun. 6, 2023 in PCT/JP2023/013433, filed on Mar. 30, 2023, 2 pages.
(Continued)

*Primary Examiner* — Arfan Y. Sinaki
(74) *Attorney, Agent, or Firm* — Oblon, McClelland, Maier & Neustadt, L.L.P.

(57) ABSTRACT

A parachute includes an umbrella body including an umbrella top portion and an umbrella edge portion, and a plurality of lines. A portion along a circumferential direction in a range from the umbrella edge portion to a position on the way to the umbrella top portion is folded in a triple fold in the circumferential direction of the umbrella body and fixed by sewing to form a fold portion, and one end of one line is connected to the fold portion.

11 Claims, 22 Drawing Sheets

(51) Int. Cl.

| | |
|---|---|
| ***B64D 17/26*** | (2006.01) |
| ***B64D 17/54*** | (2006.01) |
| ***B64D 17/72*** | (2006.01) |
| ***B64D 25/04*** | (2006.01) |
| ***B64U 70/83*** | (2023.01) |

(52) U.S. Cl.

CPC .............. *B64U 70/83* (2023.01); *B64D 17/72* (2013.01); *B64D 25/04* (2013.01)

(56) References Cited

U.S. PATENT DOCUMENTS

| | | | | |
|---|---|---|---|---|
| 2,929,588 | A | 3/1960 | Ewing | |
| 4,739,956 | A | 4/1988 | Rives et al. | |
| 6,056,241 | A | 5/2000 | Kasher | |
| 6,454,213 | B1 * | 9/2002 | Watkins ................. | B64D 17/10 244/145 |
| 9,676,468 | B1 | 6/2017 | Roach | |
| 12,252,257 | B2 * | 3/2025 | Kasher ................... | B64D 17/18 |
| 2004/0026568 | A1 * | 2/2004 | Drozd .................... | B64D 17/02 244/145 |
| 2005/0020393 | A1 | 1/2005 | Straka et al. | |
| 2006/0192054 | A1 | 8/2006 | Lachenmeier | |
| 2020/0216181 | A1 | 7/2020 | Yagihashi et al. | |

OTHER PUBLICATIONS

Extended European Search Report dated Nov. 26, 2025, issued in counterpart EP Application No. 23781021.3. (13 pages).

* cited by examiner (a)

(b)

SAFETY DEVICE AND FLIGHT VEHICLE PROVIDED WITH PARACHUTE HAVING AN UMBRELLA BODY FORMED OF ONE OR MORE GORES

TECHNICAL FIELD

The present invention relates to a parachute, and a safety device and a flight vehicle provided with the parachute.

BACKGROUND ART

Conventionally, a parachute has been widely used to lower a flight vehicle or a falling object falling from the flight vehicle. Furthermore, the parachute is also used as a safety device for reducing a risk of a drop accident of a drone (flight vehicle). For example, Patent Literature 1 discloses a parachute including an umbrella body formed by connecting a plurality of panels (gore) and the same number of lines as the number of panels.

CITATION LIST

Patent Literature

Patent Literature 1: US 2004/0026568 A

SUMMARY OF INVENTION

Technical Problems

However, in Patent Literature 1, in a case where the parachute is used for a relatively large flight vehicle, an umbrella body having a size in accordance with the flight vehicle is required. That is, in the parachute of Patent Literature 1, as the umbrella body is increased in size, the number of panels and the number of lines are increased. Therefore, there is a problem that man-hours such as sewing for connecting the adjacent panels and man-hours for connecting the line and the panel increase, leading to an increase in cost. On the other hand, in the parachute in which the number of panels is smaller than the number of lines, in a case where cloth is used for the fabric of the umbrella body, strength enough to withstand a line tension applied to one piece of cloth is required, and there is a problem that it is difficult to increase the size of the umbrella body.

Therefore, the present invention has been made in view of such circumstances, and an object of the present invention is to provide a parachute that can improve the strength as compared with the conventional parachute even though the number of panels is relatively small, and can be increased in size at low cost, and a safety device and a flight vehicle provided with the parachute.

Solutions to Problems (1) A parachute of the present invention includes: an umbrella body including an umbrella top portion and an umbrella edge portion; and a plurality of lines including one ends connected to the umbrella body, in which the umbrella body is formed of one or more gores, and at least one first fold portion formed with layers by folding and fixing a portion along a circumferential direction in a range from the umbrella edge portion to a position on a way to the umbrella top portion so as to form an odd number of layers in the circumferential direction of the umbrella body is provided.

(2) As another aspect, a parachute of the present invention may include: an umbrella body including an umbrella top portion and an umbrella edge portion; and a plurality of lines including one ends connected to the umbrella body, in which the umbrella body may be formed by connecting lateral side portions of a plurality of gores in a circumferential direction, and at least one of the connection portions between each of the gores and a gore adjacent to the each of the gores (hereinafter, adjacent gore) may be provided with a fold portion formed with layers by fixing in a meshed state: a first hook-shaped portion formed by folding back a portion of a lateral side portion of the gore from the umbrella edge portion to a position on a way to the umbrella top portion in a circumferential direction of the umbrella body; and a second hook-shaped portion formed by folding back a portion of a lateral side portion of the adjacent gore that corresponds to the first hook-shaped portion in a direction opposite to a folding back direction of the gore along the circumferential direction of the umbrella body.

(3) As still another aspect, a parachute of the present invention may include: an umbrella body including an umbrella top portion and an umbrella edge portion; and a plurality of lines including one ends connected to the umbrella body, in which the umbrella body may be formed by connecting lateral side portions of a plurality of gore in a circumferential direction, at least one of the connection portions between each of the gores and a gore adjacent to the each of the gores (hereinafter, adjacent gore) may be provided with: a first fixation portion formed by folding back the gore and the adjacent gore in a circumferential direction of the umbrella body to form a fold-back portion in a state where the gore and the adjacent gore are overlapped and a portion out of each lateral side portion of the gore and the adjacent gore from the umbrella edge portion to a position on a way to the umbrella top portion is fixed, and fixing the gore corresponding to a position of the fold-back portion and the adjacent gore after folding back only the gore or the adjacent gore that is on an inner side in a direction opposite to a folding back direction of the fold-back portion so as to overlap the fold-back portion; and/or a second fixation portion formed by folding back the gore and the adjacent gore in a circumferential direction of the umbrella body to form a fold-back portion in a state where the gore and the adjacent gore are overlapped and a portion out of each lateral side portion of the gore and the adjacent gore from a portion at a position on a way to the umbrella top portion from the umbrella edge portion to the umbrella top portion is fixed, and fixing the gore corresponding to a position of the fold-back portion and the adjacent gore after folding back only the gore or the adjacent gore that is on an inner side in a direction opposite to a folding back direction of the fold-back portion so as to overlap the fold-back portion, and the portion from the umbrella edge portion to a position on a way to the umbrella top portion may be formed so as to be inclined inward in a radial direction of the umbrella body in a case where the umbrella body is opened with respect to the portion from a portion at a position on a way to the umbrella top portion from the umbrella edge portion to the umbrella top portion so that an opening portion on a side of the lines of the umbrella body has a narrowed shape.

(4) In the parachutes of (1) to (3) described above, it is preferable that one end of one line of the plurality of lines is connected to the fold portion.

(5) In the parachutes of (1) to (3) described above, the number of the gores is preferably less than the number of the lines.

(6) In the parachute of (1) to (3) described above, it is preferable that a vent opened at a time of deployment is formed in the umbrella top portion, and a bag-shaped member including an intake port that takes in air through the vent is provided on an outer side of the vent.

(7) In the parachute of (6) described above, it is preferable that the parachute further includes a center cord including one end branched into a plurality of portions from a middle and connected to an edge portion of the vent.

(8) A safety device of the present invention includes: the parachute according to any one of (1) to (3) described above; a container that accommodates the parachute; and an ejection device that is provided in the container and ejects the parachute to an outside of the container.

(9) In the safety device of (8) described above, preferably, the safety device is attachable to a flight vehicle, and further includes an abnormality detection device capable of detecting an abnormality of the flight vehicle or a surrounding environment, in which the abnormality detection device activates the ejection device in a case of detecting the abnormality.

(10) The safety device of (9) described above preferably further includes a flight control unit that stops a propulsion device provided in the flight vehicle in a case where the abnormality detection device detects the abnormality.

(11) A flight vehicle of the present invention includes: an airframe; the safety device according to (8) described above, the safety device being provided in the airframe; and one or more propulsion mechanisms coupled to the airframe to propel the airframe.

Advantageous Effects of Invention

According to the present invention, it is possible to provide a parachute capable of improving the strength as compared with the conventional parachute even though the number of panels is relatively small, and capable of increasing the size at low cost, and a safety device and a flight vehicle provided with the parachute.

DESCRIPTION OF EMBODIMENTS

Hereinafter, a parachute according to an embodiment of the present invention will be described with reference to the drawings.

First Embodiment

Figure 1:
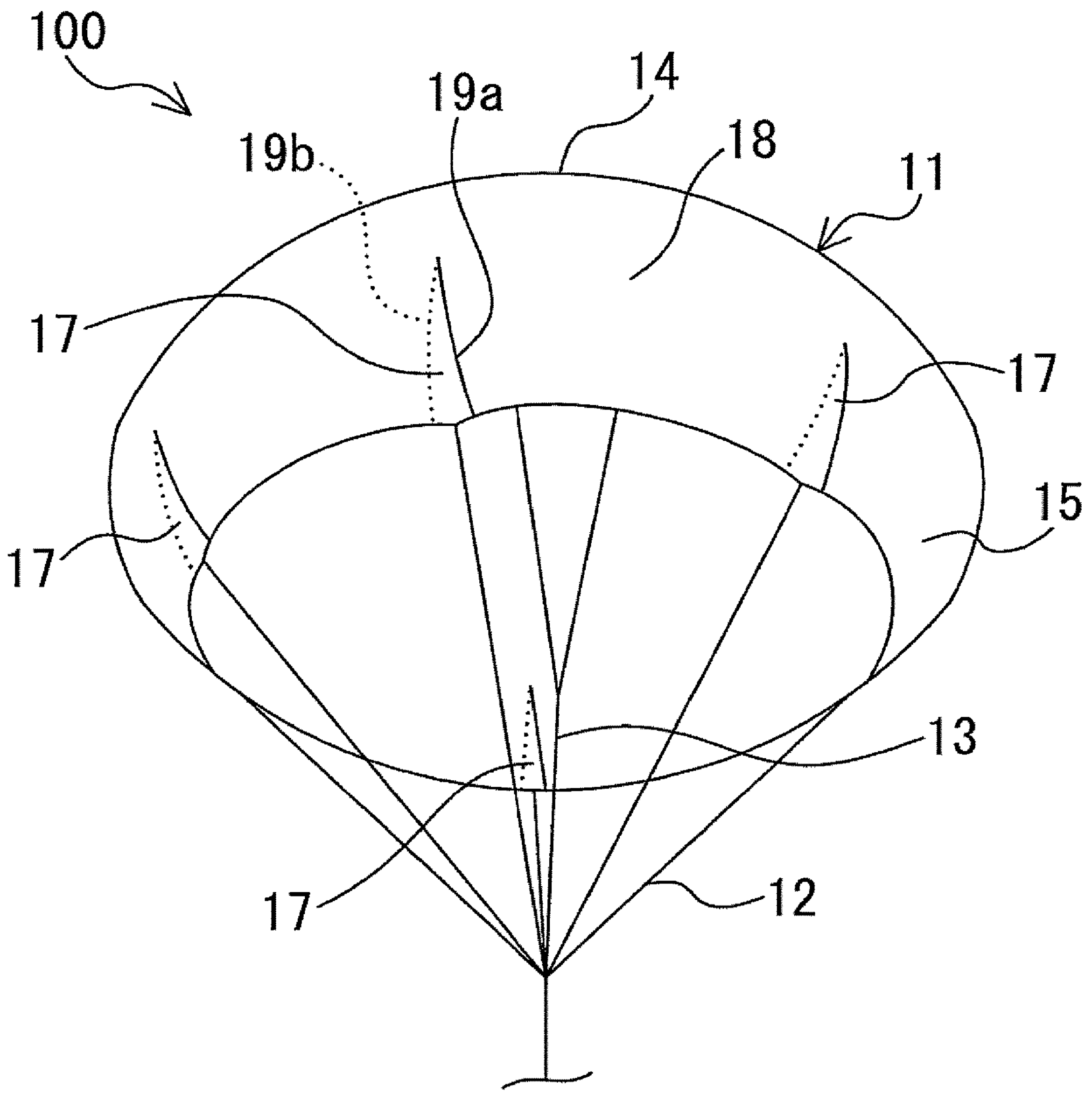
FIG. 1 is a perspective view illustrating a state after deployment of a parachute according to a first embodiment of the present invention.

As illustrated in FIG. 1, a parachute 100 according to the present embodiment includes an umbrella body 11, a plurality of (six in the present embodiment) lines 12, and a center cord 13.

Figure 2:
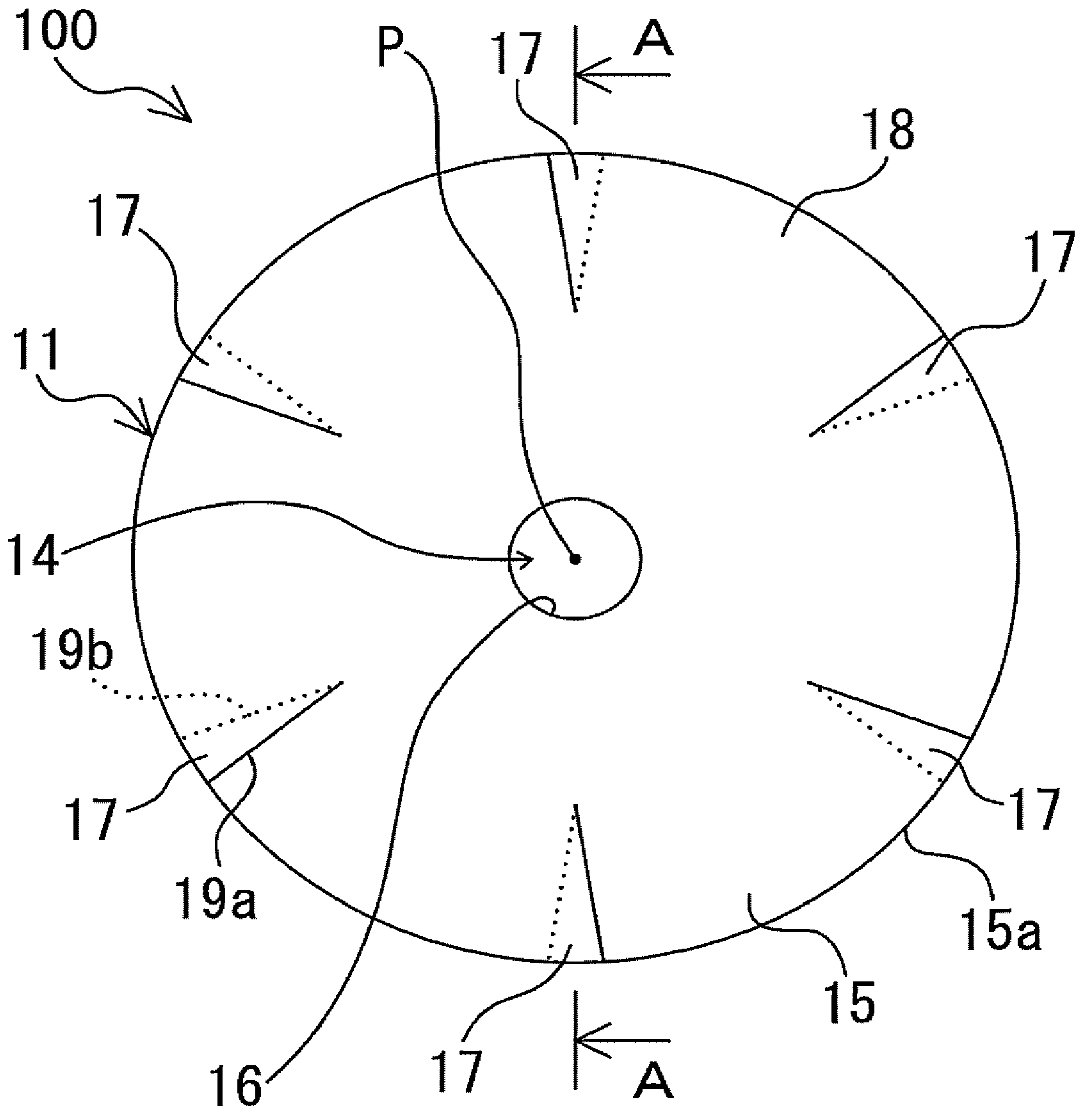
FIG. 2 is a plan view of the parachute in FIG. 1.
Figure 3:
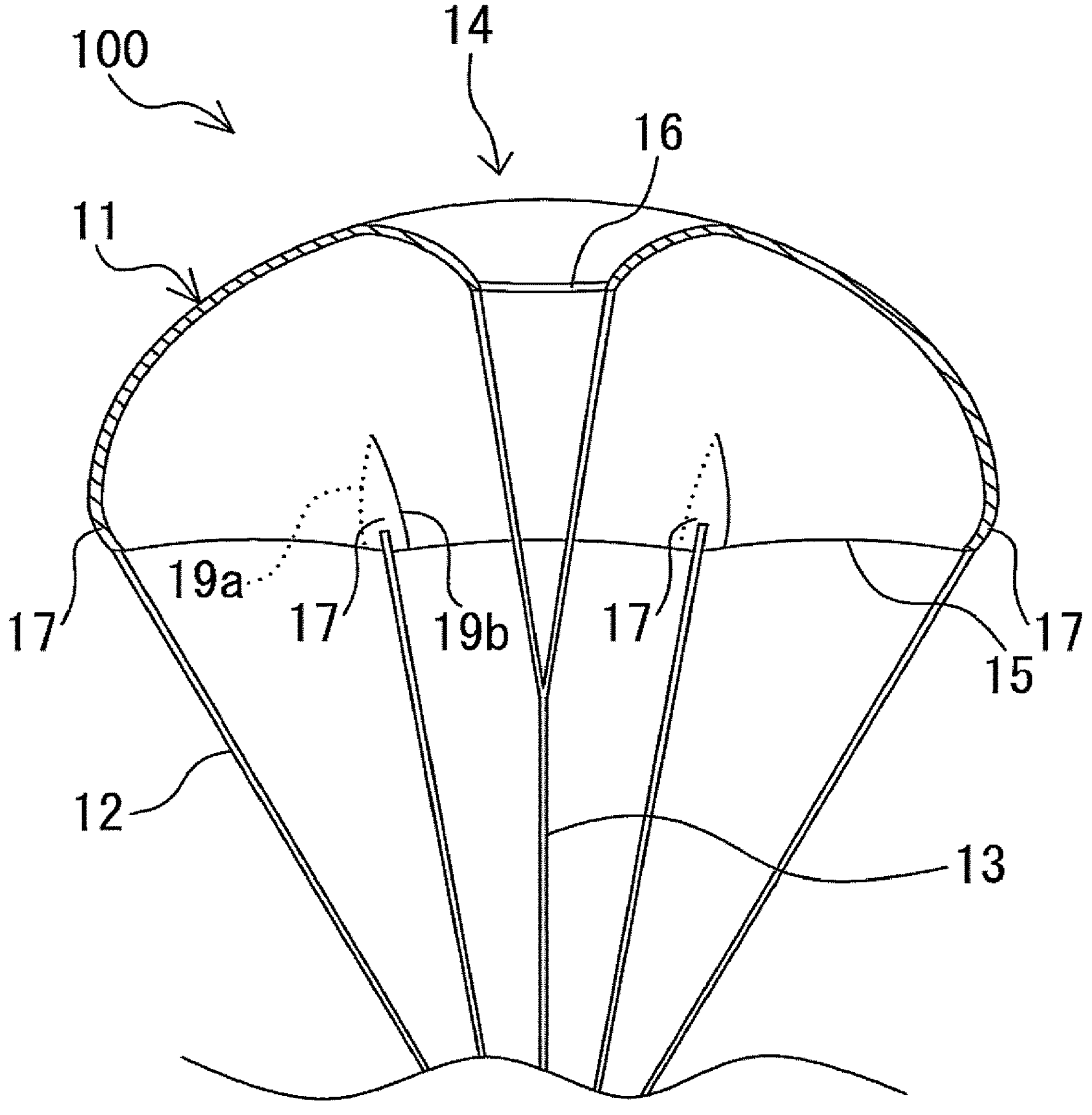
FIG. 3 is a schematic cross-sectional view taken along line A-A in FIG. 2.

As illustrated in FIGS. 1 and 2, the umbrella body 11 includes an umbrella top portion 14 constituting a top portion, an umbrella edge portion 15 constituting an opening, a vent 16, and a plurality of (six in the present embodiment) fold portions 17 (first fold portions). Furthermore, the umbrella body 11 is formed of one gore 18 having a substantially donut shape in plan view, and a cloth-like body made of a fiber material is used as a fabric of the gore 18. Furthermore, the vent 16 is provided in the umbrella top portion 14, and as illustrated in FIG. 3, the center cord 13 is connected to a peripheral edge portion of the vent 16. Note that, when opening of the umbrella body 11 is started, tension is applied to the center cord 13, so that the vent 16 is easily opened. Furthermore, in a case where the umbrella body 11 is completely opened, the tension of the center cord 13 is applied to the peripheral edge portion of the vent 16, so that the umbrella body 11 has a shape in which the umbrella top portion 14 is recessed as illustrated in FIG. 3.

Each of the lines 12 is a cord-like connection member including one end connected to the fold portion 17 and the other end connected to the inside of a container 201 of a safety device 200 described later. Note that examples of a method of attaching the line 12 to the fold portion 17 include welding, sewing, and an adhesive. Furthermore, the one end of the line 12 may be connected to any position on the outer side, the inner side, or between layers of the fold portion 17.

The center cord 13 is a cable-like connection member including one end branched into a plurality of portions from the middle and connected to the peripheral edge portion of the vent 16, and the other end connected to the inside of the container 201 of the safety device 200 to be described later. Note that examples of a method of attaching the center cord 13 to the peripheral edge portion of the vent 16 include welding, sewing, and an adhesive.

Figure 4:
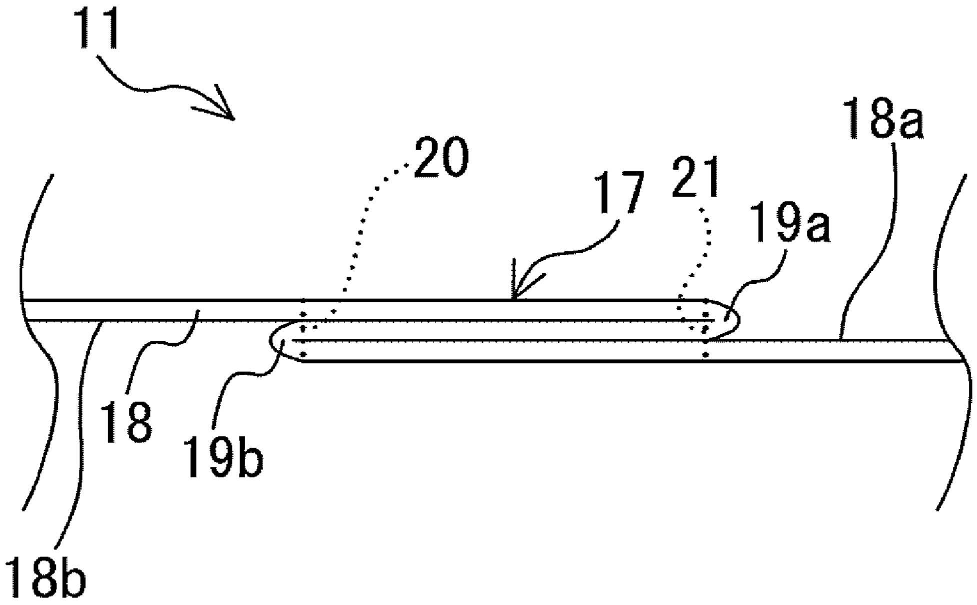
FIG. 4 is a diagram illustrating how to fold a fold portion in the parachute of FIG. 1.

As illustrated in FIG. 2, the six fold portions 17 are disposed at equal intervals in a circumferential direction of the umbrella body 11, and are provided so as to be symmetrical with respect to a vertex P of the umbrella body 11. Furthermore, as illustrated in FIG. 4, the fold portion 17 is formed in a substantially triangular shape (see FIG. 2) in plan view by being folded in a triple fold in the circumferential direction of the umbrella body 11 from an opening end 15*a* of the umbrella edge portion 15 to a position on the way to the umbrella top portion 14 (for example, to about any degree in a range of ¼ to ¾ in a vertical direction from the opening end 15*a*). That is, the fold portion 17 includes a front surface-side fold-back portion 19*a* of the gore 18 and a back surface-side fold-back portion 19*b* of the gore 18. The front surface-side fold-back portion 19*a* is sewn to a side of a front surface 18*a* of the gore 18 using a parachute yarn 20 (for example, yarn made of polyamide-based fibers, yarn made of high-strength polyethylene fibers, and the like). Furthermore, the back surface-side fold-back portion 19*b* is sewn to a side of a back surface 18*b* of the gore 18 using a yarn 21 similar to the yarn 20. Note that FIG. 4 is a diagram in a case where the fold portion 17 is viewed from a lower portion of the opening end 15*a* of the umbrella edge portion 15 in FIG. 2. Furthermore, a folding direction of the fold portion 17 may be a direction opposite to a direction illustrated in FIGS. 2 and 4, or the folding directions of all the fold portions 17 may not be the same. Furthermore, the fold portion 17 is fixed at two positions using the yarns 20 and 21 and formed, but may be fixed at three or more positions and formed, or may be fixed by another method such as welding or an adhesive and formed. Furthermore, the fold portion 17 has a substantially triangular shape in plan view, but is not limited thereto, and may have, for example, an elongated substantially trapezoidal shape, a substantially quadrangular shape, or the like.

In a case where the umbrella body 11 is completely opened, the fold portion 17 according to the present embodiment is curved inward in a radial direction of the umbrella body 11 as illustrated in FIGS. 1 and 3. Therefore, in the umbrella body 11, a shape in which the opening of the umbrella edge portion 15 is narrowed, that is, a three-dimensional extended skirt shape is formed. Therefore, the parachute 100 including the umbrella body 11 having the above-described configuration can improve a drag coefficient by forming the three-dimensional extended skirt shape after deployment. That is, in the parachute 100 being lowered, swinging is suppressed, and the parachute can be stably lowered.

Furthermore, since the fold portion 17 is folded in the triple fold, a relatively high strength is secured in the parachute 100, so that the parachute has a strength enough to withstand a line tension after the start of deployment. Therefore, a relatively thin cloth-like body can be used as the fabric of the gore 18, and the weight of the parachute 100 can be reduced. Furthermore, according to the present embodiment, since the number of the gores 18 is smaller than the number of the lines 12, it is possible to increase the size and to reduce the cost of the parachute 100.

Figure 5:
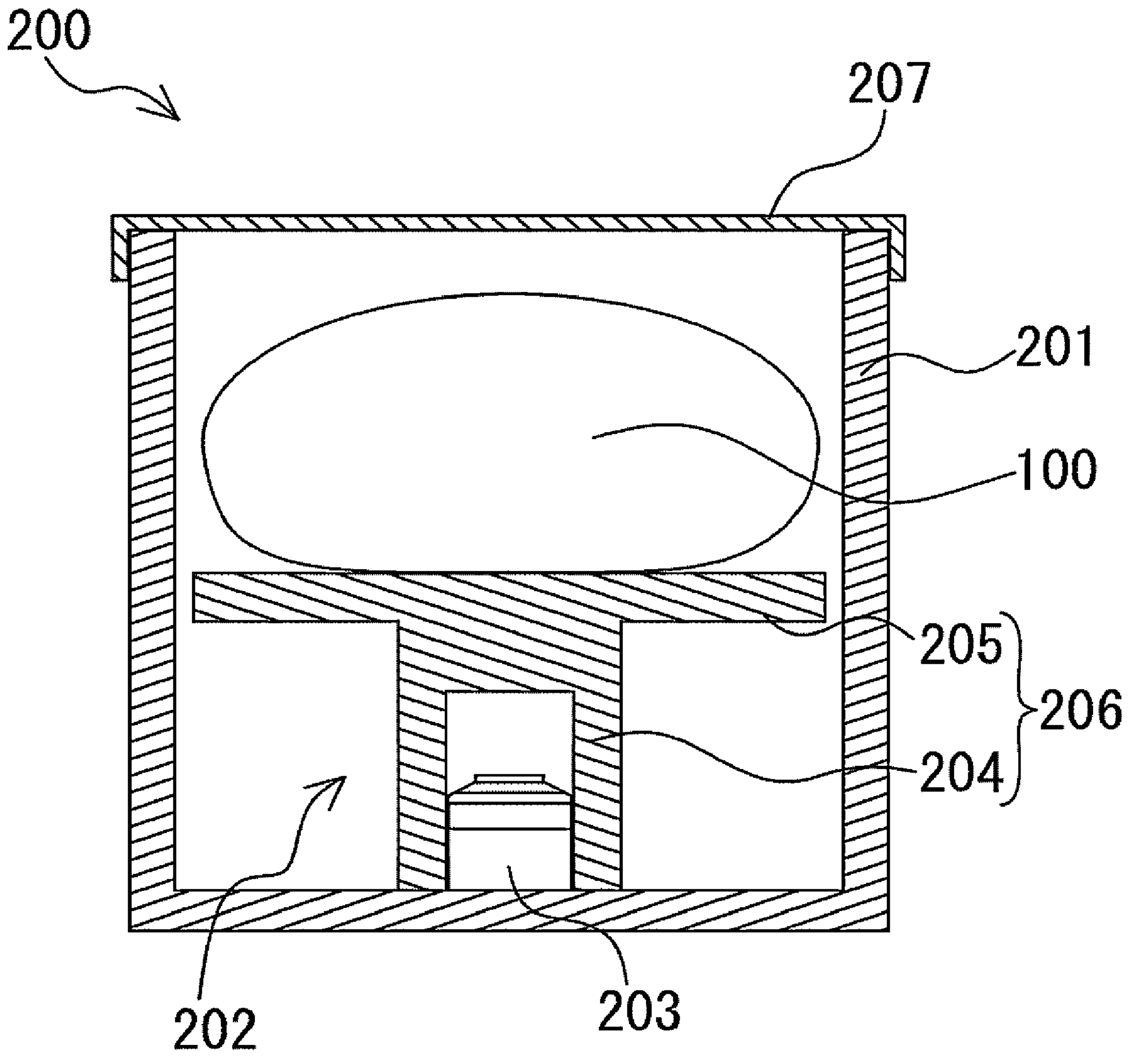
FIG. 5 is a schematic cross-sectional view illustrating a safety device according to the first embodiment.

Furthermore, the parachute 100 according to the embodiment of the present invention may be applied to a safety device for reducing a risk such as a fall accident of a flight vehicle. For example, the parachute 100 can be used for the safety device 200 as illustrated in FIG. 5. Hereinafter, the safety device 200 and a flight vehicle 300 provided with the safety device will be specifically described with reference to FIGS. 5 to 7.

As illustrated in FIG. 5, the safety device 200 according to the present embodiment includes the parachute 100, a bottomed cylindrical container 201 that accommodates the parachute 100, and an ejection device 202 that is provided in the container 201 and ejects the parachute 100 to the outside of the container 201. Here, the ejection device 202 includes a gas generator 203 including a cup-shaped case that accommodates an ignition charge (not illustrated), and a piston 206 including a recess 204 and a piston head 205 integrally formed with the recess 204. Furthermore, the parachute 100 is placed on the piston head 205 in a folded state. Note that, in the safety device 200 before activation, the parachute 100 is connected to the inside of the container 201 via the line 12 and the center cord 13, and the line 12 and the center cord 13 are folded and accommodated in the container 201 so as not to hinder the movement of the piston 206 at the time of activation. Furthermore, an opening end of the container 201 is closed by a lid 207 in an initial state, and is detached from the opening end by extrusion of the parachute 100.

Figure 6:
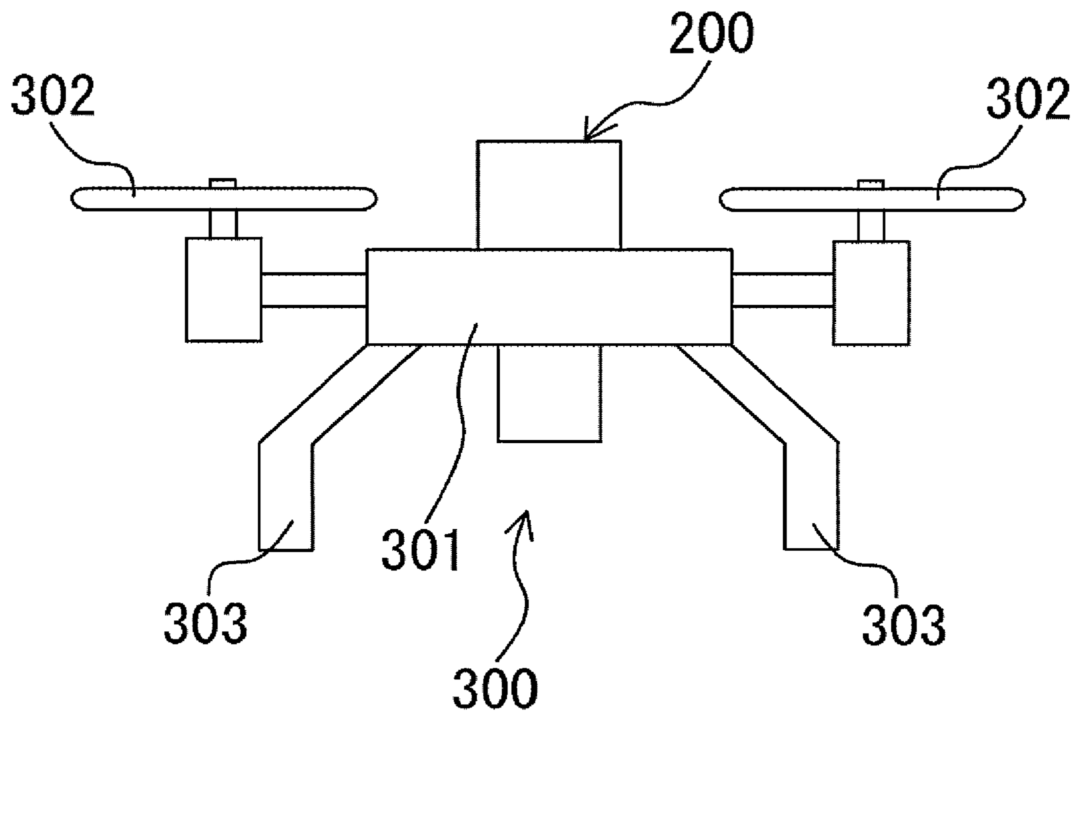
FIG. 6 is a diagram illustrating a flight vehicle to which the safety device of FIG. 5 is applied.

FIG. 6 is a diagram illustrating an example of the flight vehicle 300 to which the safety device 200 is applied. The flight vehicle 300 includes an airframe 301, the safety device 200 provided in an upper portion of the airframe 301, one or more propulsion mechanisms (for example, propellers or the like) 302 that are coupled to the airframe 301 and propel the airframe 301, and a plurality of legs 303 provided in a lower portion of the airframe 301. Furthermore, the flight vehicle 300 according to the present embodiment is not limited to an unmanned or manned aircraft such as a drone, and also includes an aircraft such as a passenger aircraft and a helicopter.

In such a configuration, when an abnormality is detected by an abnormality detection device 400 to be described later, the piston 206 is propelled by a gas pressure generated based on an ignition operation of the gas generator 203. As a result, the parachute 100 can be directly pushed out and deployed by a propulsive force of the piston 206. Therefore, the parachute 100 after the deployment can suspend the flight vehicle 300 via the line 12 and the center cord 13.

Furthermore, the safety device 200 includes the abnormality detection device 400 including an acceleration sensor or the like that detects an abnormality of the flight vehicle 300.

Figure 7:
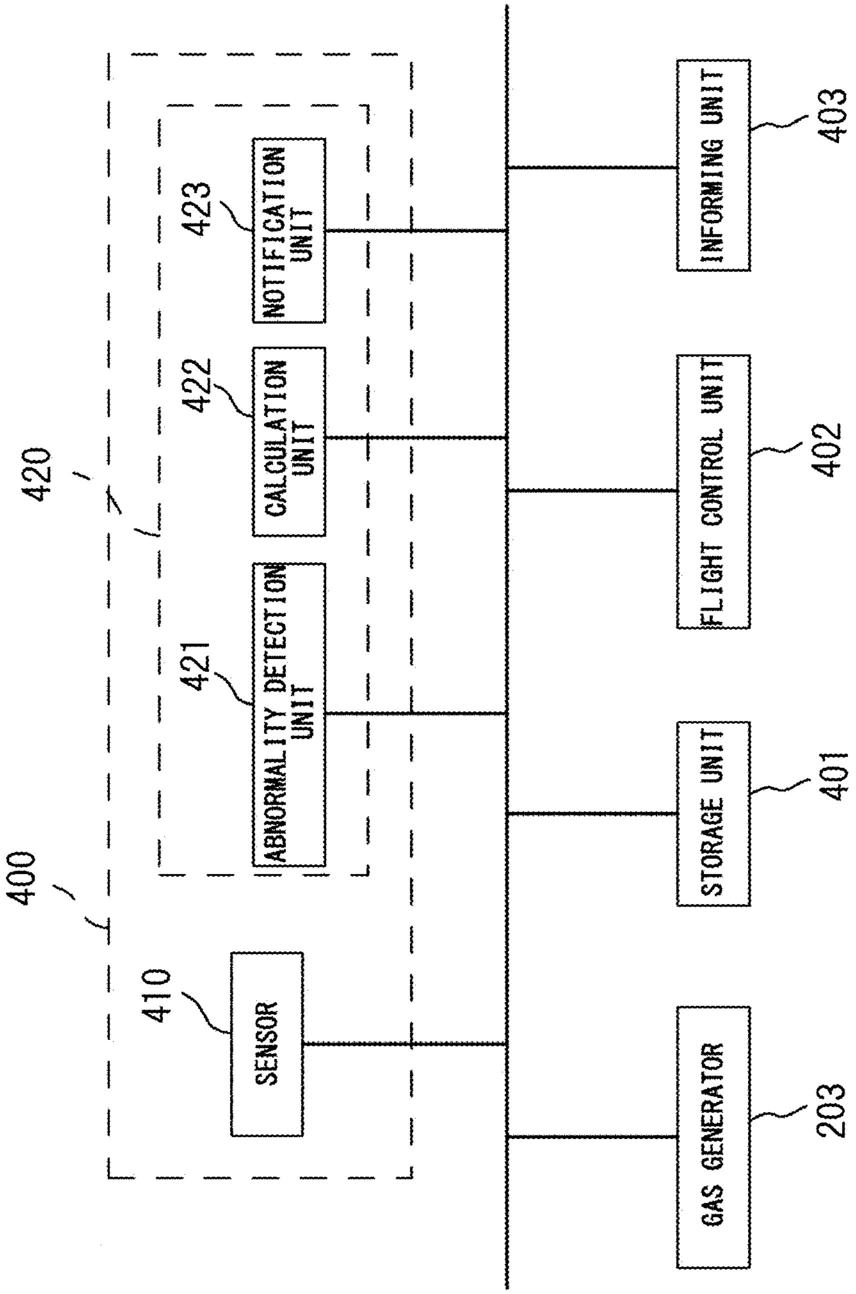
FIG. 7 is a block diagram illustrating a functional configuration of the safety device of FIG. 5.

Here, a functional configuration of the abnormality detection device 400 will be described. As illustrated in FIG. 7, the abnormality detection device 400 includes a sensor (detection unit) 410 and a control unit (computer including CPU, ROM, RAM, and the like) 420, and is electrically connected to an igniter in the gas generator 203 of the ejection device 202, a storage unit 401, a flight control unit 402, and an information unit 403.

The sensor 410 detects a flight state (including collision, crash, etc.) of the flight vehicle 300. Specifically, the sensor 410 is, for example, one or more sensors selected from an acceleration sensor, a gyro sensor, an atmospheric pressure sensor, a laser sensor, an infrared sensor, a vision sensor of a monocular/compound eye, an ultrasonic sensor, and the like, and can acquire data of a flight state of the flight vehicle 300, such as a speed, acceleration, inclination, altitude, and position of the flight vehicle 300, and an obstacle that may be a flight obstacle of the flight vehicle 300, data of a surrounding environment (obstacle, topography, shape of building, etc.), and the like.

The control unit 420 includes an abnormality detection unit 421, a calculation unit 422, and a notification unit 423 as a functional configuration. The abnormality detection unit 421, the calculation unit 422, and the notification unit 423 are functionally implemented by the control unit 420 executing a predetermined program.

The abnormality detection unit 421 not only detects an abnormal state related to the surrounding environment on the basis of information received from the sensor 410 but also detects a flight state of the flight vehicle (whether the flight vehicle 300 is in an abnormal state such as falling during flight). That is, the abnormality detection unit 421 detects whether or not the sensor 410 and the flight vehicle 300 are normally operable. For example, the abnormality detection unit 421 can detect an emergency state of a person inside the flight vehicle 300, a fatal failure of a device inside the flight vehicle 300, a power supply of the flight vehicle 300 being less than or equal to a preset predetermined value, a fuel amount of the flight vehicle 300 being less than or equal to a preset predetermined value, an acceleration or an angular velocity of the flight vehicle 300 being greater than or equal to a predetermined value or less than or equal to a predetermined value, an attitude angle of the flight vehicle 300 being greater than or equal to a predetermined value, a descent speed of the flight vehicle 300 being greater than or equal to a predetermined value, and the like. Furthermore, in a case where the flight vehicle 300 is operated by an operator using a controller, the abnormality detection unit 421 can detect disappearance of an operation signal or reception of an abnormality signal from the controller. Furthermore, the abnormality detection unit 421 can detect disappearance of a signal or reception of an abnormal signal from a ground station.

The calculation unit 422 determines whether or not the flight state of the flight vehicle 300 is abnormal on the basis of each data obtained by actual measurement by the sensor 410. Specifically, the calculation unit 422 determines an abnormality by comparing each data acquired by the sensor 410 with each preset threshold. Furthermore, the calculation unit 422 receives an obstacle detection signal, a distance detection signal, an altitude detection signal, and the like from the sensor 410 in real time, and determines an abnormality on the basis of each of these received signals. Furthermore, the calculation unit 422 determines whether the flight vehicle approaches a prohibited area, enters the prohibited area, or deviates from a planned route on the basis of the position information of the flight vehicle 300.

Furthermore, the calculation unit 422 receives a signal (a periodic digital signal (rectangular wave) or a signal always in a high voltage state) from the flight control unit 402 at a constant cycle, and determines an abnormality on the basis of disappearance of this signal or disappearance/change of periodicity. Furthermore, the calculation unit 422 detects a battery voltage of the flight vehicle 300, and determines that there is an abnormality in a case where the battery voltage is less than or equal to a preset threshold.

Furthermore, in the case of determining that the flight state of the flight vehicle 300 is abnormal, the calculation unit 422 outputs an abnormality signal (which may include a command signal for starting or activating another device) to the outside. Note that an abnormality signal output unit may be provided separately from the calculation unit 422, and the abnormality signal output unit may output an abnormality signal according to a command of the calculation unit 422.

In a case where the abnormality detection unit 421 detects an abnormality in the sensor 410 and the flight vehicle 300, the notification unit 423 notifies an administrator or the like that the abnormality has been detected.

The storage unit 401 can store various data such as each data acquired by the sensor 410 and determination data in a case where an abnormality is determined by the calculation unit 422.

The flight control unit 402 controls a flight attitude of the flight vehicle 300, and can stop a propulsion device (such as a motor) provided in the flight vehicle 300 in a case where the calculation unit 422 determines an abnormality.

In a case where the calculation unit 422 determines an abnormality, the information unit 403 can inform the surroundings of the abnormality. For example, the information unit 403 activates a voice generation device (such as an alarm) and/or a lighting device (such as an LED) to inform the surroundings of the abnormality. Furthermore, in a case where the abnormality detection device 400 includes a wireless communication unit capable of communicating with the controller of the operator of the flight vehicle 300 or the ground station, when the abnormality detection unit 421 detects an abnormality of the sensor 410 and the flight vehicle 300, the information unit 403 informs the controller of the operator or the ground station of the abnormality via the wireless communication unit. Furthermore, when the abnormality detection unit 421 detects an abnormality in the sensor 410 and the flight vehicle 300, the information unit 403 may transmit an abnormality signal to the flight control unit 402 and inform the operator's controller or the ground station of the abnormality via the wireless communication unit.

Next, an operation of the safety device 200 will be described.

First, in a case where the flight vehicle 300 is in an abnormal situation during flight, when the abnormality detection unit 421 detects an abnormal state, detects disappearance of an operation signal from the controller, or the operator operates the controller to transmit an abnormality signal to the safety device 200, the abnormality detection unit 421 transmits an abnormality signal to the calculation unit 422. Upon receiving the abnormality signal, the calculation unit 422 transmits an operation signal to the gas generator 203 of the ejection device 202. Upon receipt of this operation signal, the gas generator 203 starts the igniter and propels the piston 206 with a generated gas pressure. With this propulsion force, the umbrella body 11 of the parachute 100 is ejected to the outside of the container 201. Then, the plurality of lines 12 and the center cord 13 connected to the ejected umbrella body 11 extend, the umbrella body 11 starts to deploy, and the inflow of air to the inside of the umbrella body 11 starts. Thereafter, after the lines 12 and the center cord 13 are fully extended and stretched, that is, after the lines 12 and the center cord 13 are tensioned, the fold portion 17 is curved inward in the radial direction of the umbrella body 11, a three-dimensional extended skirt shape is formed, and the umbrella body 11 is fully opened (see FIG. 1).

Therefore, according to the safety device 200, since the three-dimensional extended skirt shape is formed in the parachute 100 after deployment, the drag coefficient can be improved, and the swing of the flight vehicle 300 hung on the parachute 100 is suppressed. That is, the flight vehicle 300 can be stably lowered.

Second Embodiment

Next, a parachute according to a second embodiment will be described with reference to FIGS. 8 and 9. Note that, in the present embodiment, reference signs having the same numbers in the last two digits as those in the first embodiment are similar, and thus the description thereof may be omitted. Furthermore, portions that are not particularly described are similar to those of the first embodiment, and thus description and illustration thereof may be omitted.

Figure 8:
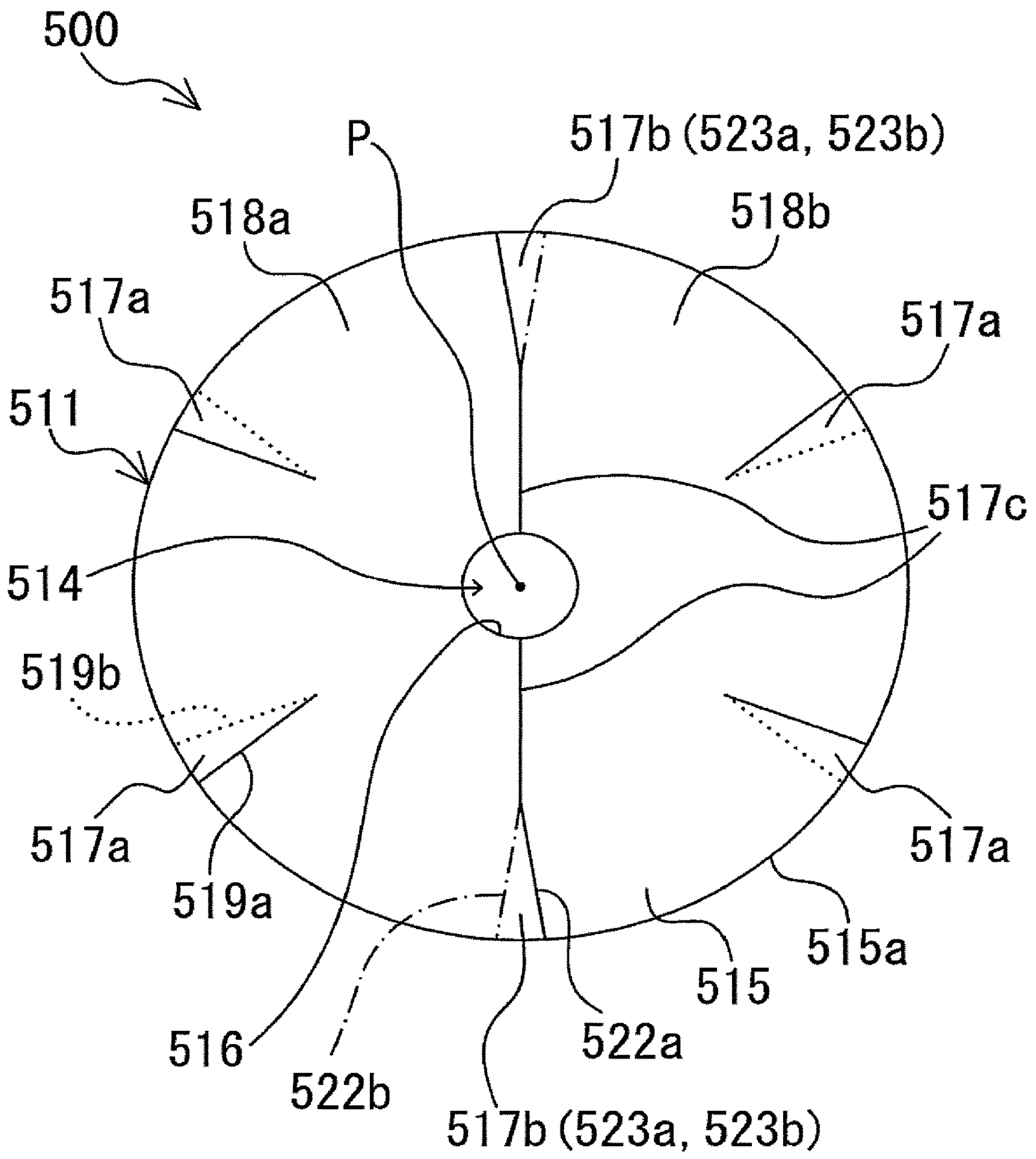
FIG. 8 is a plan view of a parachute according to a second embodiment of the present invention.
Figure 9:
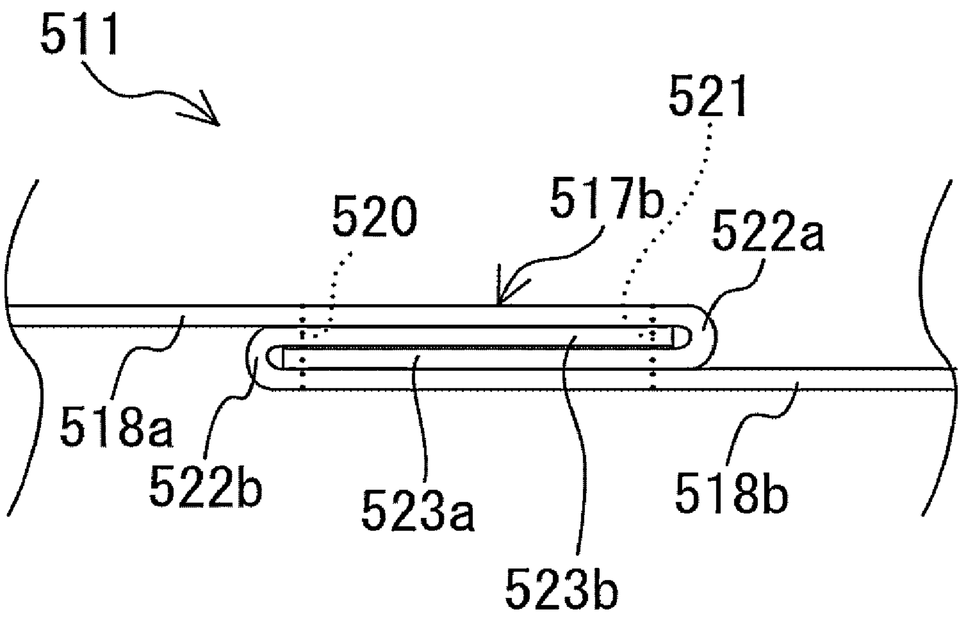
FIG. 9 is a diagram illustrating how to fold a second fold portion in the parachute of FIG. 8.

As illustrated in FIG. 8, a parachute 500 according to the second embodiment is different from that of the first embodiment in that an umbrella body 511 is configured using two gores 518*a* and 518*b*.

The umbrella body 511 includes an umbrella top portion 514 constituting a top portion, an umbrella edge portion 515 constituting an opening, a vent 516, four first fold portions 517*a*, and two second fold portions 517*b*. Note that a line 512 is connected to each of the first fold portions 517*a* and each of the second fold portions 517*b*. Furthermore, a center cord 513 is connected to a peripheral edge portion of the vent 516.

As illustrated in FIG. 8, the umbrella body 511 includes the two gores 518*a* and 518*b* having a substantially half donut shape in plan view. Note that the linear portions of the respective gores 518*a* and 518*b* are joined together by welding, sewing, an adhesive, or the like in a state of being simply superimposed, for example, to form a connection portion 517*c*.

The four first fold portions 517*a* are disposed at predetermined intervals in a circumferential direction of the umbrella body 511, and are provided so as to be symmetrical with respect to a vertex P of the umbrella body 511. Note that each of the first fold portions 517*a* is folded in a triple fold in the circumferential direction of the umbrella body 511, similarly to the fold portion 17 of the first embodiment.

The second fold portions 517*b* are provided so as to face each other with the vertex P of the umbrella body 511 as a center. Furthermore, the second fold portion 517*b* is a connection portion formed with layers by fixing in a meshed state a portion (first hook-shaped portion) formed by folding back a lateral side portion 523*a* of the gore 518*a* from an opening end 515*a* of the umbrella edge portion 515 to a position on the way to the umbrella top portion 514 (for example, to about any degree in a range of ¼ to ¾ in a vertical direction from the opening end 515*a*) in the circumferential direction of the umbrella body 511 and a portion (second hook-shaped portion) formed by folding back a lateral side portion 523*b* of the gore 518*b* corresponding to (adjacent to) the lateral side portion 523*a* of the gore 518*a* in a direction opposite to a folding back direction of the gore 518*a* along the circumferential direction of the umbrella body 511. Furthermore, as illustrated in FIG. 9, the second fold portion 517*b* is formed in a substantially triangular shape (see FIG. 8) in plan view from the opening end 515*a* of the umbrella edge portion 515 to a position on the way to the umbrella top portion 514. Note that, by using yarns 520 and 521 similar to the yarn 20 of the first embodiment, the lateral side portions 523*a* and 523*b* are sewn to the gores 518*a* and 518*b*, so that the four-layer structure of a main body of the gore 518*b*, the lateral side portion 523*a*, the lateral side portion 523*b*, and a main body of the gore 518*a* is formed and fixed from the lower part of the paper surface of FIG. 9. Note that FIG. 9 is a diagram in a case where the second fold portion 517*b* is viewed from the opening end 515*a* of the umbrella edge portion 515 on the lower side of FIG. 8. Furthermore, the second fold portion 517*b* is fixed and formed at two positions using the yarns 520 and 521, but may be fixed and formed at three or more positions, or may be fixed and formed by another method such as welding or an adhesive.

The first fold portion 517*a* and the second fold portion 517*b* according to the second embodiment are curved inward in the radial direction of the umbrella body 511 in a case where the umbrella body 511 is completely opened. Thus, in the umbrella body 511, a shape in which the opening of the umbrella edge portion 515 is narrowed, that is, a three-dimensional extended skirt shape is formed. Therefore, the parachute 500 including the umbrella body 511 having the above configuration can improve the drag coefficient by forming the three-dimensional extended skirt shape after deployment. That is, in the parachute 500 being lowered, swinging is suppressed, and the parachute can be stably lowered.

Furthermore, since the parachute 500 is formed such that the first fold portion 517*a* and the second fold portion 517*b* are partially overlapped with each other, a relatively high strength is secured, and thus the parachute has a strength enough to withstand the line tension after the start of deployment. Therefore, a relatively thin cloth-like body can be used as the fabric of the gore 518*a* and 518*b*, and the weight of the parachute 500 can be reduced. Furthermore, according to the second embodiment, since the number of the gores 518 is smaller than the number of the lines 512, it is possible to increase the size and to reduce the cost of the parachute 500. Furthermore, the parachute 500 according to the second embodiment can be applied to a safety device (similar to the safety device 200 of the first embodiment) for reducing a risk such as a falling accident of a flight vehicle.

Although the embodiments of the present invention have been described above, it is merely an example, and the present invention is not particularly limited, and the specific configuration and the like can be modified in design as appropriate. Furthermore, the actions and effects described in the embodiments of the present invention merely enumerate the most suitable actions and effects resulting from the present invention, and the actions and effects according to the present invention are not limited to those described in the embodiments of the present invention.

In each of the above embodiments, the case where the center cord is connected to the peripheral edge portion of the vent of the umbrella body has been described, but the center cord may not necessarily be provided in the parachute.

Furthermore, in each of the above embodiments, the description has been given of the case where the six fold portions are provided so as to be positioned on a side of the opening end of the umbrella edge portion in the circumferential direction of the umbrella body, but the present invention is not limited thereto, and at least one fold portion may be provided at a position including the umbrella edge portion and not in contact with the vent of the umbrella top portion. Furthermore, in each of the above embodiments, the case where the first fold portion is folded in the triple fold in the circumferential direction of the umbrella body has been described, but the present invention is not limited thereto. For example, the fold portion may be formed by folding so as to form an odd number of layers such as a five-fold or a seven-fold in the circumferential direction of the umbrella body.

Furthermore, in the second embodiment, the parachute 500 is provided with the pair of second fold portions 517*b*, but the present invention is not limited thereto. For example, only one of the second fold portions 517*b* may be provided, and the other may be a connection by simple overlapping.

Furthermore, in the second embodiment, the parachute 500 including the two gores 518*a* and 518*b* is shown, but the present invention is not limited thereto. For example, three or more gores may be connected. At this time, at least one of connection portions between the lateral side portions of the gores may be similar to the second fold portion 517*b*.

Furthermore, in each of the above embodiments, each line is connected one by one to a portion having a relatively high strength such as the first fold portion and the second fold portion, but the present invention is not limited thereto. For example, in a case where the strength of the gore itself is sufficiently high, the line may be connected to a portion other than the first fold portion and the second fold portion without necessarily connecting the line to the first fold portion and the second fold portion.

Furthermore, in each of the above embodiments, the parachute may include a float (bag-shaped member) that functions as a floating member when landing on water. For example, the following modifications of the parachute are also conceivable. Note that, in the following modification, reference signs having the same numbers in the last two digits as those of the first embodiment are similar, and thus the description thereof may be omitted. Furthermore, portions that are not particularly described are similar to those of the first embodiment, and thus description and illustration thereof may be omitted.

First Modification

Figure 10:
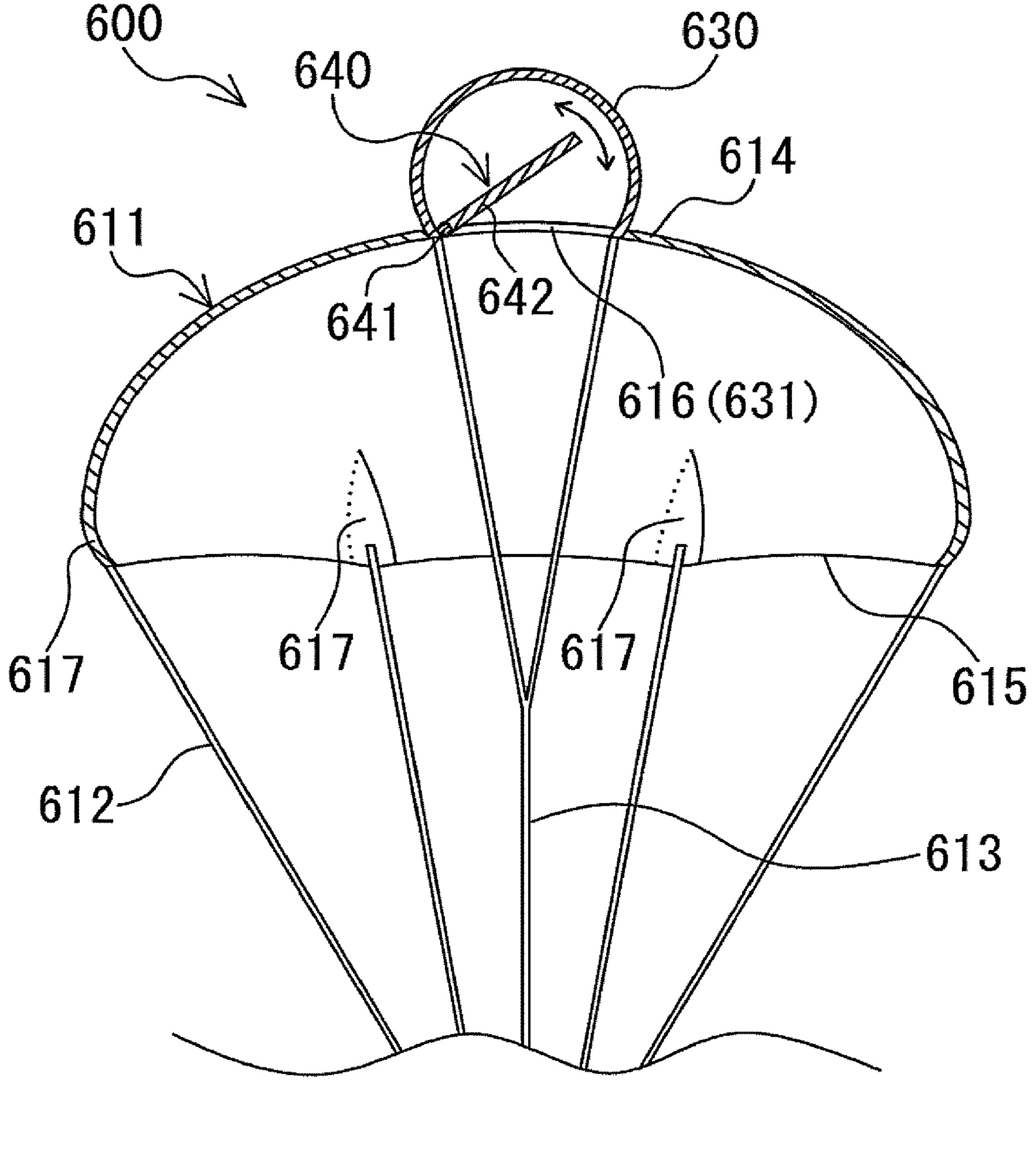
FIG. 10 is a schematic cross-sectional view illustrating an example of a parachute according to a first modification of the present invention.

As illustrated in FIG. 10, a parachute 600 according to a first modification includes an umbrella body 611, a plurality of lines 612, a center cord 613, and a bag-shaped member 630. Note that the bag-shaped member 630 including an intake port 631 connected to a vent 616 is provided outside an umbrella top portion 614 of the umbrella body 611, and the center cord 613 is connected to a peripheral edge portion of the vent 616 or the intake port 631. Furthermore, each of the lines 612 is connected to a fold portion 617.

Furthermore, when the parachute 600 is deployed, air flows into the inside of the bag-shaped member 630 from the intake port 631, the bag-shaped member 630 expands in a substantially spherical shape. Furthermore, the bag-shaped member 630 is configured by joining at least three or more polygonal (triangular, trapezoidal, etc.) or at least three or more ship-bottom shaped waterproof panel members by welding, sewing, an adhesive, or the like. Here, examples of the fabric of the waterproof panel member include a cloth-like body formed using a fiber material, a film-like body formed using a resin film and a rubber film, and the like. Note that, as a method of attaching the bag-shaped member 630 to the umbrella body 611, any one of welding, sewing, and an adhesive can be used.

Furthermore, as illustrated in FIG. 10, the intake port 631 of the bag-shaped member 630 is provided with a check valve 640 including a hinge portion 641 and a plate member 642. The plate member 642 is rotatably provided in an inner peripheral edge portion of the intake port 631 via the hinge portion 641 as indicated by an arrow in FIG. 10. Note that a rotation angle of the plate member 642 is limited so as to freely open in an internal direction of the bag-shaped member 630 via the hinge portion 641 but not to open in an external direction (not to rotate to the inside of the umbrella body 611). Note that examples of the material of the plate member 642 include cloth, resin, rubber, and metal.

In such a bag-shaped member 630, when the parachute 600 is deployed, the edge portions of the vent 616 and the intake port 631 are pulled to the lower side of FIG. 10 by the center cord 613 and are pulled radially outward from a center by the line 612, so that the check valve 640 provided in the intake port 631 can be opened and closed. Then, the plate member 642 is pushed toward the inside of the bag-shaped member 630 by further inflow of air into the umbrella body 611, the intake port 631 is opened, the air naturally flows into the bag-shaped member 630, and the bag-shaped member 630 expands and deploys in a substantially spherical shape.

Therefore, in the parachute 600, the bag-shaped member 630 can be rapidly expanded, and the descent speed of the flight vehicle can be decelerated to reduce the impact on the flight vehicle at the time of landing on water. Furthermore, at the time of water landing, the inflow of air into the inside of the umbrella body 611 is stopped, and the intake port 631 is closed by the weight of the check valve 640 (in particular, the plate member 642). Therefore, the air inside the bag-shaped member 630 stays inside the bag-shaped member 630, and it is possible to suppress water from entering the bag-shaped member 630. As a result, since the bag-shaped member 630 exerts sufficient buoyancy at the time of landing on water, it is possible to prevent the flight vehicle from sinking in the water.

Figure 11:
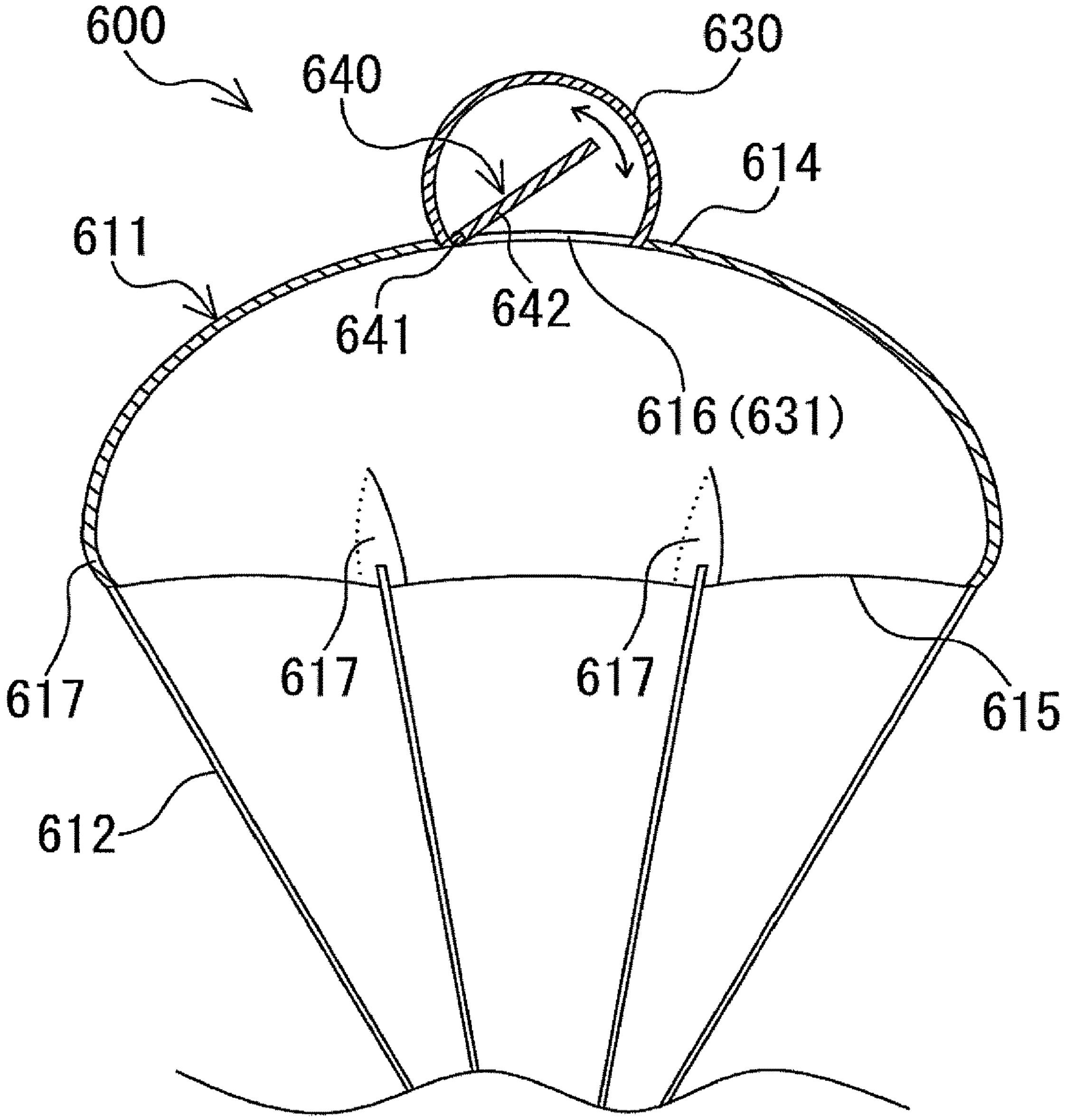
FIG. 11 is a schematic cross-sectional view illustrating another example of the parachute according to the first modification of the present invention.

Note that, in the present modification, the center cord 613 is provided at the vent 616 of the umbrella body 611 or the peripheral edge portion of the intake port 631 of the bag-shaped member 630, but the present invention is not limited thereto, and the center cord 613 may not be provided. That is, as illustrated in FIG. 11, the parachute 600 of the present modification may have a configuration in which the bag-shaped member 630 functioning as a floating member at the time of landing on water is attached to the outside of the vent 616 of the umbrella body 611.

Second Modification

Figure 12:
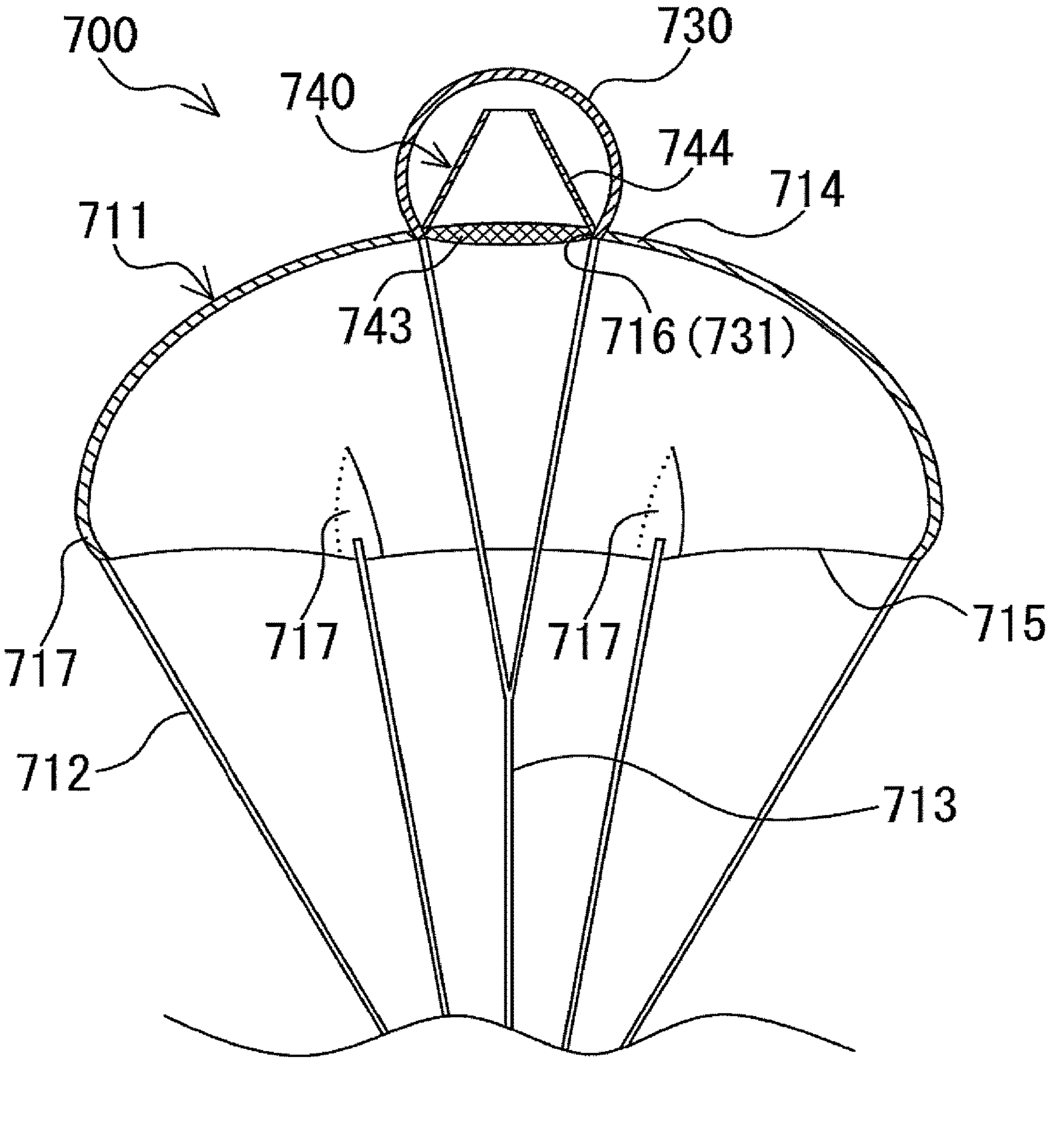
FIG. 12 is a schematic cross-sectional view illustrating a parachute according to a second modification of the present invention.

As illustrated in FIG. 12, a parachute 700 according to the second modification includes an umbrella body 711, a plurality of lines 712, a center cord 713, and a bag-shaped member 730. Note that the bag-shaped member 730 including an intake port 731 connected to a vent 716 is provided outside an umbrella top portion 714 of the umbrella body 711, and the center cord 713 is connected to a peripheral edge portion of the vent 716 or the intake port 731. Furthermore, each of the lines 712 is connected to a fold portion 717.

Furthermore, a check valve 740 including a net member 743 and a truncated cone portion 744 having a truncated cone shape when air flows in from the intake port 731 is provided in the vent 716 of the umbrella body 711 or the intake port 731 of the bag-shaped member 730. The net member 743 is formed in a mesh shape having air permeability, and is provided so as to cover the intake port 731. The truncated cone portion 744 includes an opening in each of an upper portion and a lower portion, and an opening end portion of the lower portion is attached to an edge portion of the vent 716 or the intake port 731, so that air flowing in from the vent 716 and the intake port 731 passes through the inside. Note that examples of the fabric of the truncated cone portion 744 include a cloth-like body formed using a fiber material, a film-like body formed using a resin film, and the like.

Figure 13:
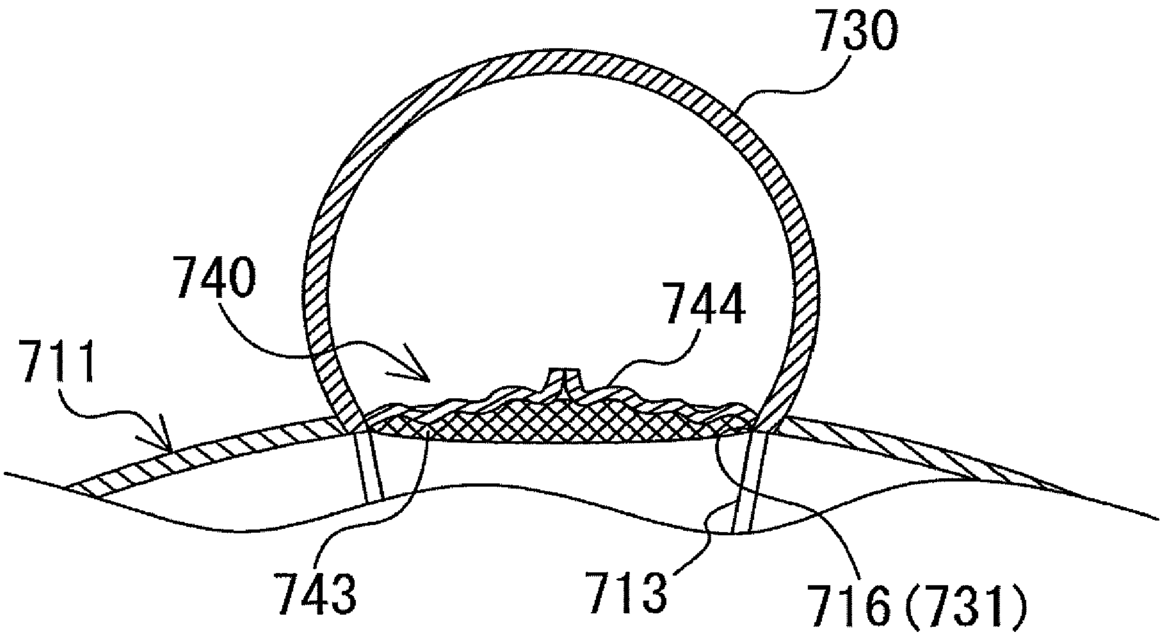
FIG. 13 is a schematic partially enlarged cross-sectional view illustrating a state of a check valve after landing on water in the parachute of FIG. 12.

In the bag-shaped member 730 including such a check valve 740, when the parachute 700 is deployed, first, the air flowing into the umbrella body 711 flows into the truncated cone portion 744 via the vent 716, the intake port 731, and the net member 743 to form a truncated cone shape. Subsequently, the introduced air passes through the truncated cone portion 744 and is taken into the bag-shaped member 730. That is, as illustrated in FIG. 12, the bag-shaped member 730 is in an expanded state. At the time of water landing, the inflow of air into the umbrella body 711 is stopped, and as illustrated in FIG. 13, the truncated cone shape of the truncated cone portion 744 collapses and collapses due to its own weight, whereby the vent 716 and the intake port 731 are closed. As a result, the air inside the expanded bag-shaped member 730 can be prevented from easily coming out to the outside. Therefore, according to the parachute 700, since the bag-shaped member 730 exhibits sufficient buoyancy at the time of landing on water, it is possible to prevent the flight vehicle from sinking in the water. Note that, in the parachute 700 of the present modification, the center cord 713 may not necessarily be provided similarly to the first modification.

Third Modification

Figure 14:
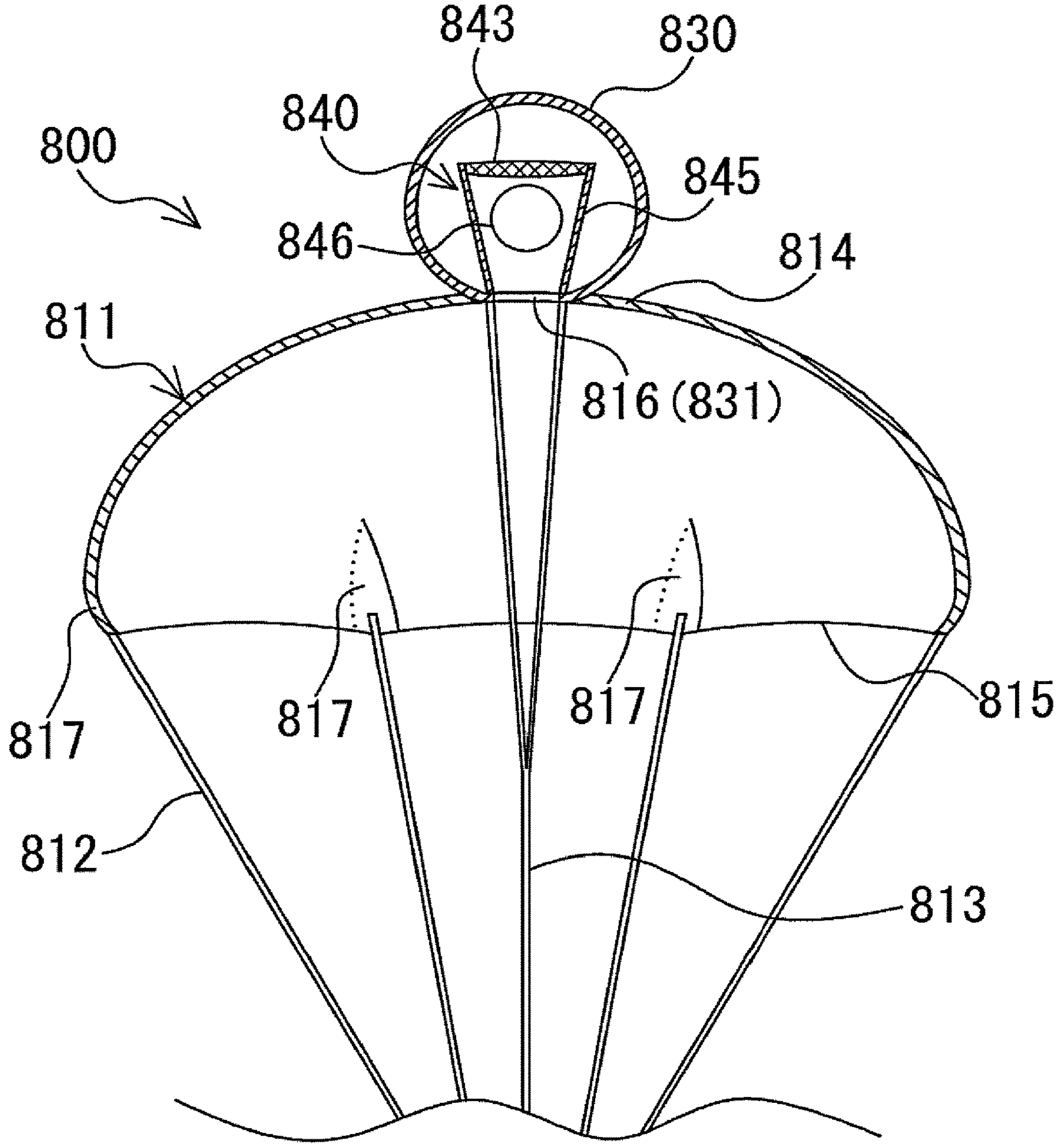
FIG. 14 is a schematic cross-sectional view illustrating a parachute according to a third modification of the present invention.

As illustrated in FIG. 14, a parachute 800 according to the third modification includes an umbrella body 811, a plurality of lines 812, a center cord 813, and a bag-shaped member 830. Note that the bag-shaped member 830 including an intake port 831 connected to a vent 816 is provided outside an umbrella top portion 814 of the umbrella body 811, and the center cord 813 is connected to a peripheral edge portion of the vent 816 or the intake port 831. Furthermore, each of the lines 812 is connected to a fold portion 817.

Furthermore, a check valve 840 is provided in the vent 816 of the umbrella body 811 or the intake port 831 of the bag-shaped member 830. The check valve 840 includes a net member 843, an inverted truncated cone portion 845 having an inverted truncated cone shape when air flows in from the intake port 831, and a plastic hollow relatively light ball 846. The net member 843 is formed in a mesh shape having air permeability, and is provided so as to cover an upper opening of the inverted truncated cone portion 845. The inverted truncated cone portion 845 includes an opening in each of an upper portion and a lower portion, and an opening end portion of the lower portion is attached to an edge portion of the vent 816 or the intake port 831, so that the air flowing in from the intake port 831 passes through the inside. Furthermore, the ball 846 is provided inside the inverted truncated cone portion 845 so as to be movable between the net member 843, and the vent 816 and the intake port 831. Note that a diameter of the ball 846 is set to be larger than a diameters of the vent 816 and the intake port 831. Furthermore, examples of the fabric of the inverted truncated cone portion 845 include a cloth-like body formed using a fiber material and a film-like body formed using a resin film.

Figure 15:
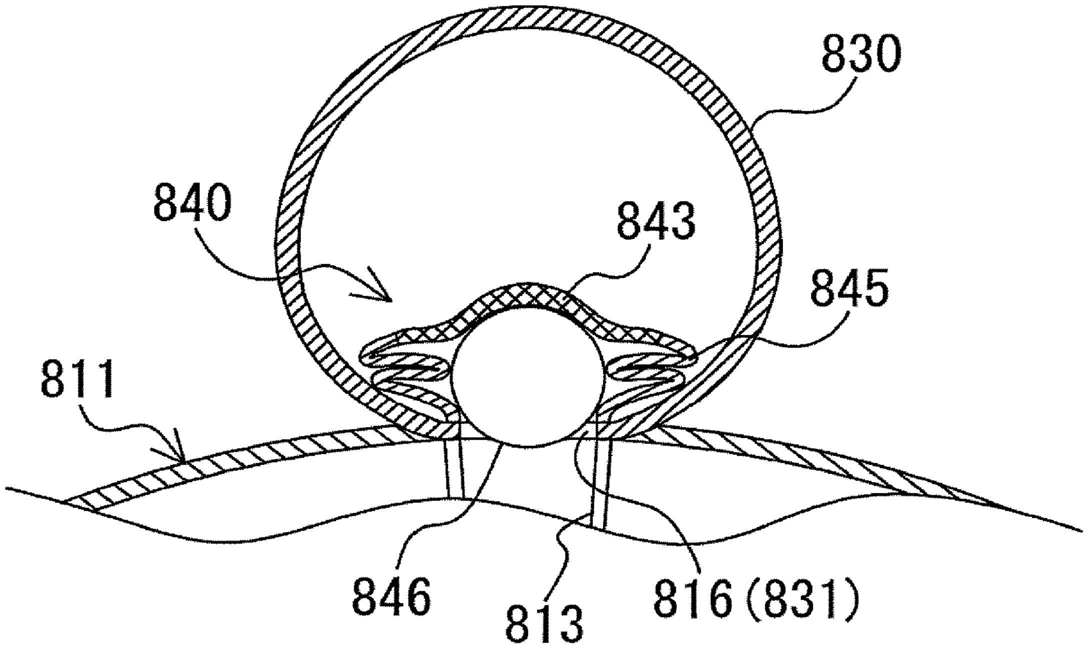
FIG. 15 is a schematic partially enlarged cross-sectional view illustrating a state of a check valve after landing on water in the parachute of FIG. 14.

In the bag-shaped member 830 including such a check valve 840, when the parachute 800 is deployed, first, the ball 846 blown by the air flowing into the umbrella body 811 moves toward the net member 843. Subsequently, air flows into the inverted truncated cone portion 845 from the vent 816 and the intake port 831, forms the inverted truncated cone shape and passes through the inverted truncated cone portion, and is taken into the bag-shaped member 830. That is, as illustrated in FIG. 14, the bag-shaped member 830 is in an expanded state. Then, at the time of water landing, the inflow of air into the umbrella body 811 is stopped, and as illustrated in FIG. 15, the inverted truncated cone shape of the inverted truncated cone portion 845 and the net member 843 collapses and collapses due to its own weight, and the ball 846 closes the vent 816 and the intake port 831. As a result, the air inside the expanded bag-shaped member 830 can be prevented from easily coming out to the outside. Therefore, according to the parachute 800, since the bag-shaped member 830 exhibits sufficient buoyancy at the time of landing on water, it is possible to prevent the flight vehicle from sinking in the water. Note that, in the parachute 800 of the present modification, the center cord 813 may not necessarily be provided as in the first modification.

Furthermore, in each of the above modifications, the vent of the umbrella body and the intake port of the bag-shaped member are formed in the same portion, but may not necessarily be formed in the same portion. For example, the intake port may be attached so as to cover the outside periphery of the vent in a sealed manner, and the check valve may be attached to either the vent or the intake port.

Furthermore, in the above embodiments and modifications, the flight vehicle may include an airbag device that inflates the airbag. For example, the airbag device can be provided at the lower portion of the airframe in a normal attitude so as to face a main body of the safety device provided at the upper portion of the airframe in the normal attitude with the airframe interposed therebetween. In this case, the impact on the flight vehicle at the time of landing on the water can be further reduced.

Furthermore, in the above embodiments and modifications, the flight vehicle may include a float disposed separately from the parachute. For example, the float can be provided at the lower portion of the airframe in the normal attitude so as to face the main body of the safety device provided at the upper portion of the airframe in the normal attitude with the airframe interposed therebetween. In this case, it is possible to further prevent the flight vehicle from sinking in the water.

Figure 16:
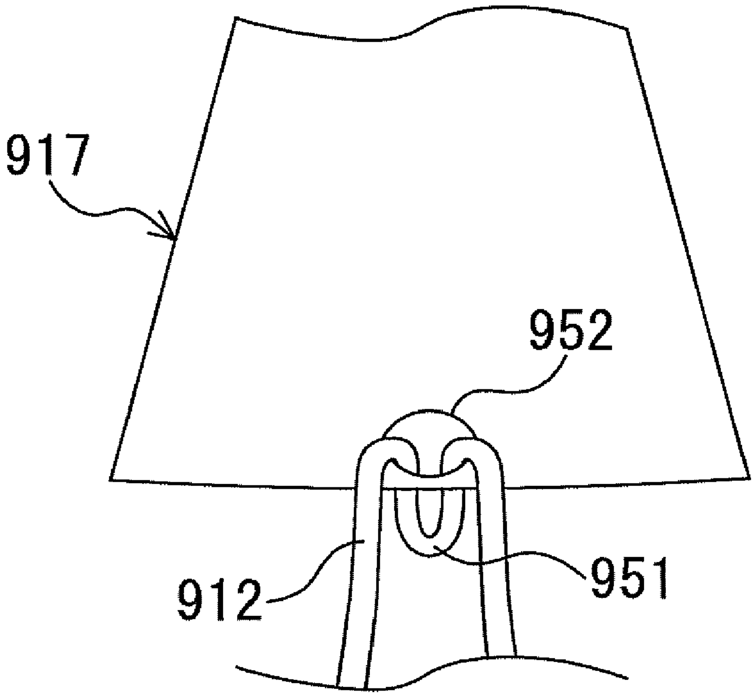
FIG. 16 is a diagram illustrating an example of a method of attaching a line to a fold portion in the present invention.
Figure 16:
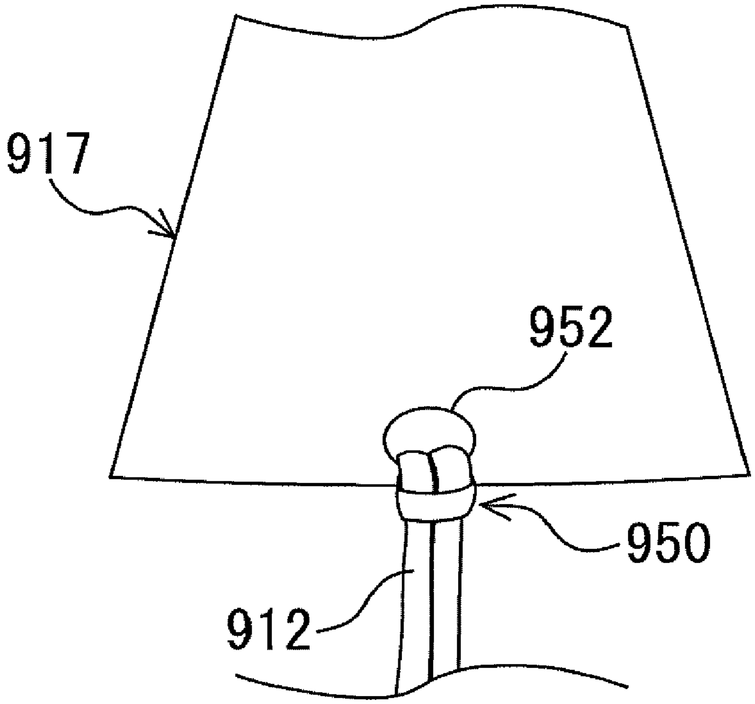

Furthermore, in each of the above embodiments and modifications, a knot generally called a cow-hitch (Hibari knot) may be used as a method of attaching the line to the fold portion. In this knotting method, for example, as illustrated in a partially enlarged view of a fold portion 917 in FIG. 16(*a*), first, a line 912 folded back to form an annular portion 951 is passed through a hole 952 provided on the lower end side of the fold portion 917 from above, and the annular portion 951 is pulled out from the lower end of the fold portion 917. Next, the two other ends of the line 912 are passed through the drawn annular portion 951 from above and pulled downward as they are, whereby a cow-hitch portion 950 is formed as illustrated in a partially enlarged view of the fold portion 917 in FIG. 16(*b*). Therefore, the line 912 is reliably connected to the fold portion 917 via the cow-hitch portion 950. Note that, instead of the hole 952, an annular string member or a metal member may be provided at the lower end of the fold portion 917, and the line 912 may be tied to the string member or the metal member in the same procedure as described above.

Figure 17:
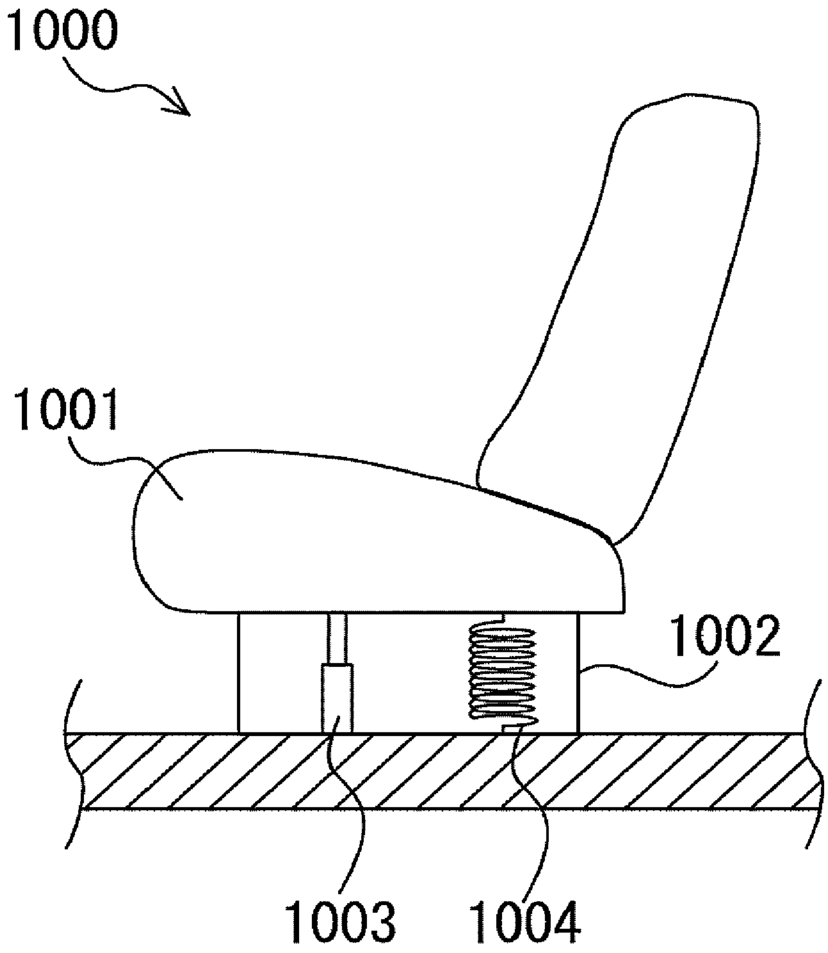
FIG. 17 is a diagram illustrating an example of an impact-absorbing seat applied to a flight vehicle in the present invention.

Furthermore, in each of the above embodiments and modifications, in a case where the flight vehicle can carry a person inside, an impact-absorbing member may be adopted for the seat. For example, as illustrated in FIG. 17, an impact-absorbing seat 1000 provided with an impact-absorbing mechanism 1002 between a seat 1001 and a floor surface inside the flight vehicle can be used. The impact-absorbing mechanism 1002 includes a damper member 1003 and a spring member 1004. Furthermore, the seat 1001 is connected to a floor surface in the flight body via a damper member 1003 and a spring member 1004. In such an impact-absorbing seat 1000, an impact on the occupant at the time of landing can be reduced.

Furthermore, in each of the above embodiments and modifications, the gas generator is adopted as the drive source of the ejection device, but the drive source is not limited thereto, and for example, an elastic body type using an elastic body such as a spring, a gas cylinder type using a gas pressure confined in a container, a chemical reaction type (non-gunpowder) in which two or more substances are mixed and chemically reacted to generate a gas pressure, or the like may be adopted. Furthermore, a pull-out type ejection device may be used instead of the ejection device of each of the embodiments and each of the modifications. Examples of the pull-out type ejection device include a method in which a weight is flicked by an actuator and then an object to be deployed is pulled out, a method in which a rocket is launched and an object to be deployed is pulled out, and a method in which a pilot chute is first ejected and an object to be deployed is pulled out by the pilot chute.

Furthermore, in each of the above embodiments and modifications, the case where the ejection device includes the gas generator and the piston having the recess and the piston head integrally formed with the recess has been described, but the present invention is not limited thereto. For example, the ejection device may include a piston member (sliding member), a cylinder that accommodates the piston member and is provided with a hole for the piston member to protrude outward at the time of activation, a pushing member (hat-shaped member like a hat) pushed up in one direction by the piston member, and a gas generator as a power source for moving the piston member in the cylinder. Note that, in this ejection device, the gas generator is press-fitted into the lower opening end of the cylinder, and the lower portion of the cylinder is fixed to the bottom portion of the container.

In the safety device including the ejection device having such a configuration, when the gas generator is activated when the abnormality is detected, the piston member is propelled upward in the cylinder by the pressure of the gas generated by the activation, and the pushing member connected to the piston member is propelled upward in the container. As a result, the lid is pushed up by the upper portion of the push-up member and removed from the opening end of the container, and the parachute placed on the flange-shaped portion of the push-up member is ejected to the outside of the container.

Furthermore, in each of the above embodiments and modifications, the case where the safety device includes the bottomed cylindrical container that accommodates the parachute and the ejection device, and the lid that closes the opening end of the container has been described, but the present invention is not limited thereto. For example, the safety device may include a bottomed cylindrical accommodation lid (bottomed cylindrical member) that accommodates the parachute and the ejection device, and a substantially disk-shaped bottom portion that closes an opening end portion of the accommodation lid. Note that the ejection device of the safety device includes a piston member (sliding member), a cylinder that accommodates the piston member and is provided with a hole through which the piston member protrudes outward at the time of activation, a base (squib holder) to which one end portion of the cylinder is caulked and fixed and which is attached via a central hole of a bottom portion, and a gas generator as a power source for moving the piston member in the cylinder. Furthermore, the accommodation lid includes a breakable portion in the vicinity of the opening end portion. Furthermore, the bottom portion includes a cylindrical protrusion extending from the edge toward the accommodation lid, and the protrusion and the side wall portion of the opening end portion of the accommodation lid can be engaged with each other using a pin member such as a brush clip pin. Furthermore, the parachute is accommodated between the inner surface of the accommodation lid and the inner surface of the bottom portion so as to surround the outer surface of the cylinder, for example. Furthermore, one end of a connection member is connected to a part of the parachute, and the other end of the connection member is connected to the inside of the accommodation lid.

In the safety device having such a configuration, when the gas generator is activated when an abnormality is detected, the piston member is propelled upward in the cylinder by the pressure of the gas generated by the activation, and the piston member abuts on the accommodation lid. The breakable portion of the accommodation lid is broken by the impact at the time of abutment, the opening end portion of the accommodation lid is opened, the accommodation lid is detached from the bottom portion, and the accommodation lid is ejected upward while pulling up one end of the connection member. Then, when tension is applied to the connection member, the parachute is pulled up and ejected to a side of the accommodation lid.

Furthermore, in each of the above embodiments and modifications, the case where the other ends of the line and the center cord are connected to the inside of the container has been described, but the present invention is not limited thereto, and for example, the line and the center cord may be connected to the outside of the container or an airframe of the flight vehicle.

In each of the above embodiments and modifications, an example in which the safety device is attached to the flight vehicle has been described, but the present invention is not limited thereto. For example, in a case where a cargo is dropped from a flight vehicle onto water, it is also possible to attach the safety device according to the present invention to the cargo before being dropped for use.

Figure 18:
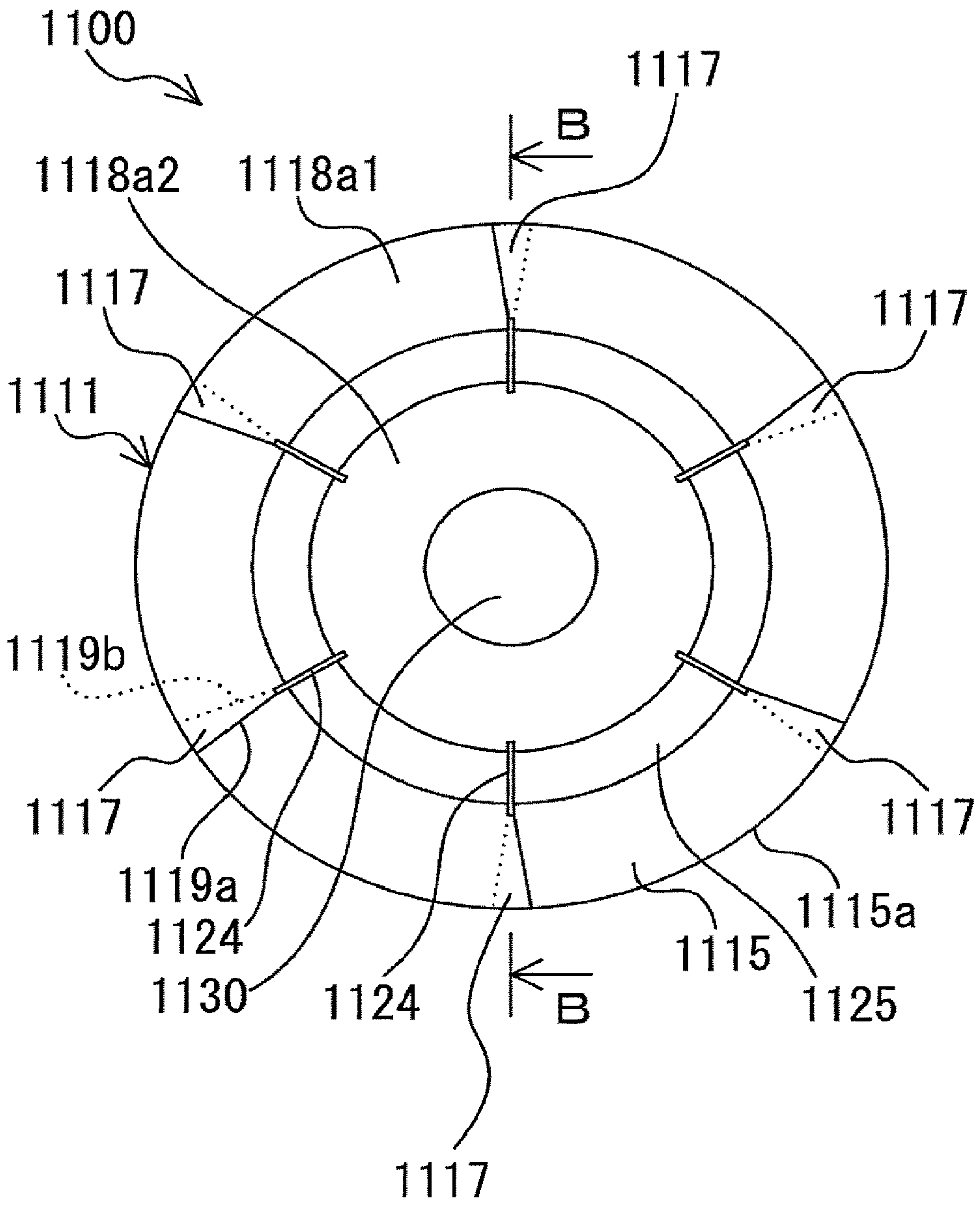
FIG. 18 is a plan view illustrating a modification of the parachute illustrated in FIG. 10.
Figure 19:
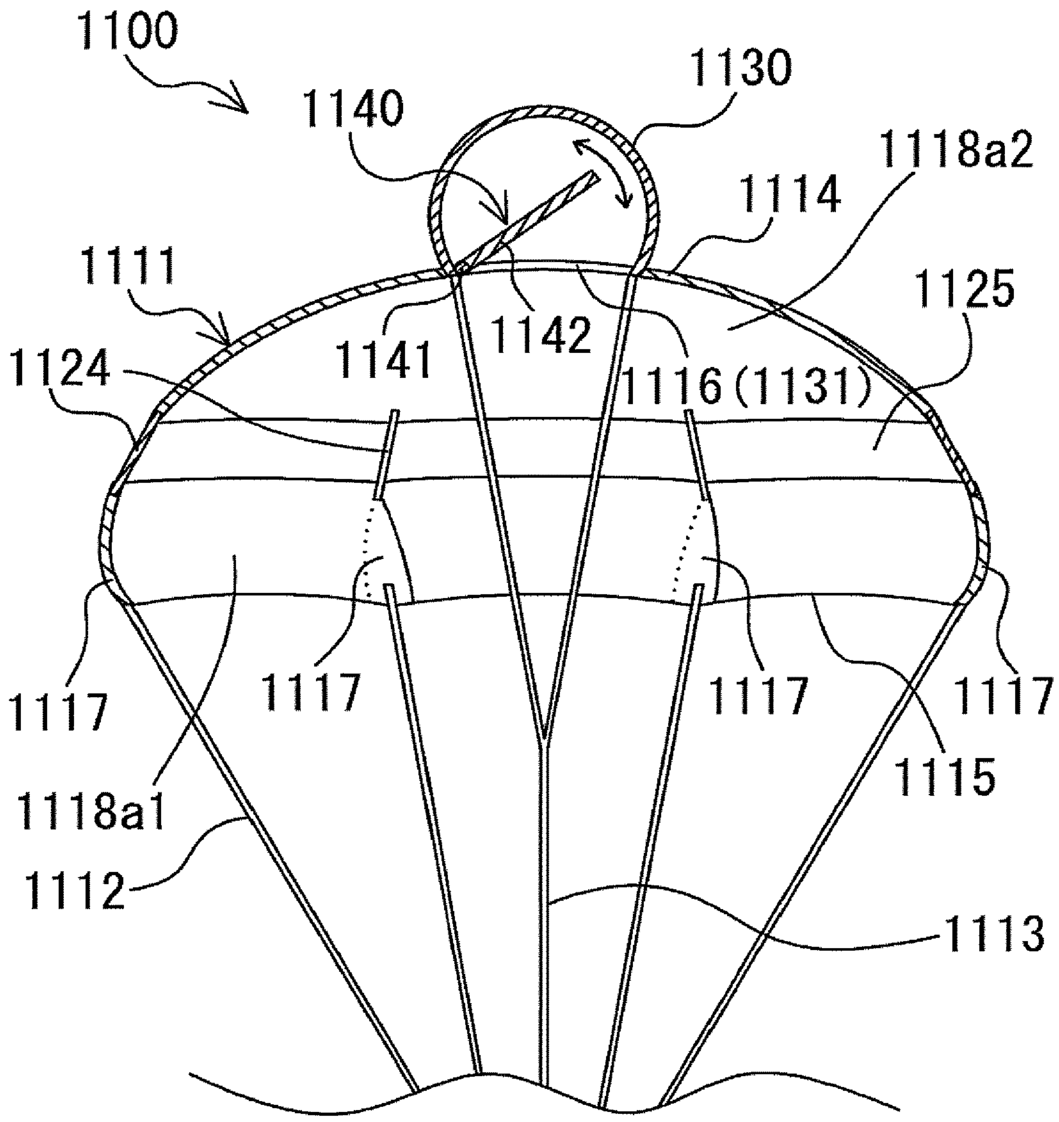
FIG. 19 is a schematic cross-sectional view taken along line B-B in FIG. 18.

Furthermore, as a modification of the parachute 600 of the first modification, as illustrated in FIGS. 18 and 19, a parachute 1100 called a disk band gap type parachute can also be exemplified. The parachute 1100 is mainly different in that an umbrella body 1111 is used instead of the umbrella body 611 in the parachute 600. Hereinafter, the parachute 1100 will be described focusing on differences from the parachute 600 of the first modification. Note that, in the present modification, reference signs of the same numbers in the last two digits as those in the first embodiment or the first modification are similar to those in the first embodiment or the first modification, and thus description thereof may be omitted. Portions that are not particularly described are the same as those in the first embodiment or the first modification, and thus description and illustration thereof may be omitted.

The umbrella body 1111 includes a lower-side gore 1118*a*1 that forms a lower portion of the umbrella body 1111, an upper-side gore 1118*a*2 that forms an upper portion of the umbrella body 1111, a line 1124 that connects the lower-side gore 1118*a*1 and the upper-side gore 1118*a*2, and a ventilation portion 1125 (six places at equal intervals in the present modification) that is surrounded between the adjacent lines 1124 and between the upper-side gore 1118*a*2 and the lower-side gore 1118*a*1 and becomes a vent hole for air after deployment. That is, the umbrella body 1111 is different from the umbrella body 611 in the parachute 600 in that the line 1124 and the ventilation portion 1125 are provided.

One end portion of the line 1124 is fixed to a fold portion 1117 by sewing or the like, and the other end portion is fixed to the upper-side gore 1118*a*2 by sewing or the like. Six lines 1124 of the present modification are disposed side by side at equal intervals in the circumferential direction.

Since the ventilation portion 1125 is provided in the umbrella body 1111, the air flowing into the inside of the umbrella body 1111 after the deployment passes through the ventilation portion 1125, it is possible to suppress the pendulum motion (oscillation) of the parachute 1100.

Note that, in the second modification and the third modification, similarly to the modification of the first modification illustrated in FIGS. 18 and 19, by providing a ventilation portion similar to the ventilation portion 1125, it is possible to suppress the pendulum motion (oscillation) of the parachute.

Figure 20:
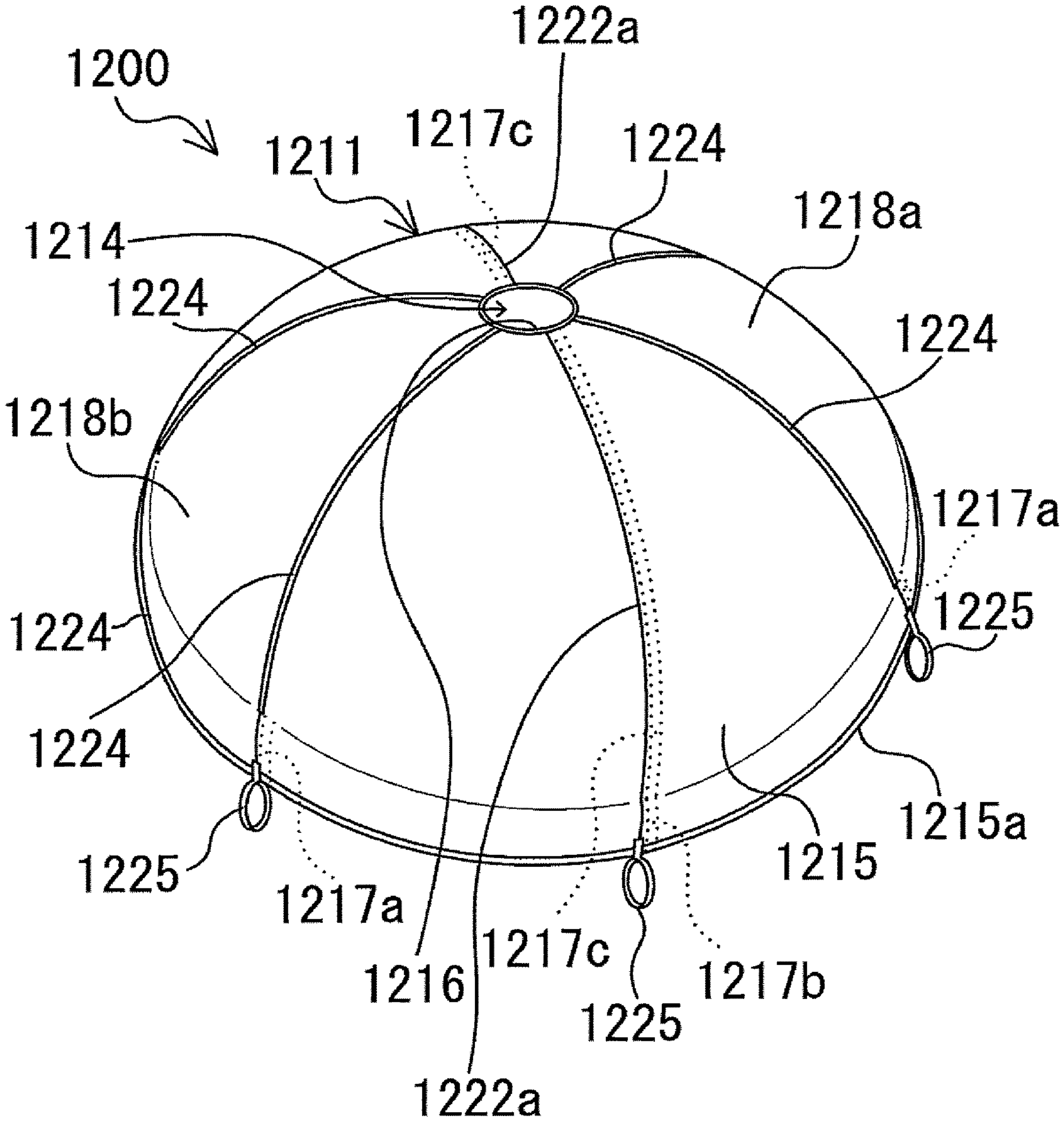
FIG. 20 is a perspective view of a parachute according to a modification of the second embodiment of the present invention.
Figure 21:
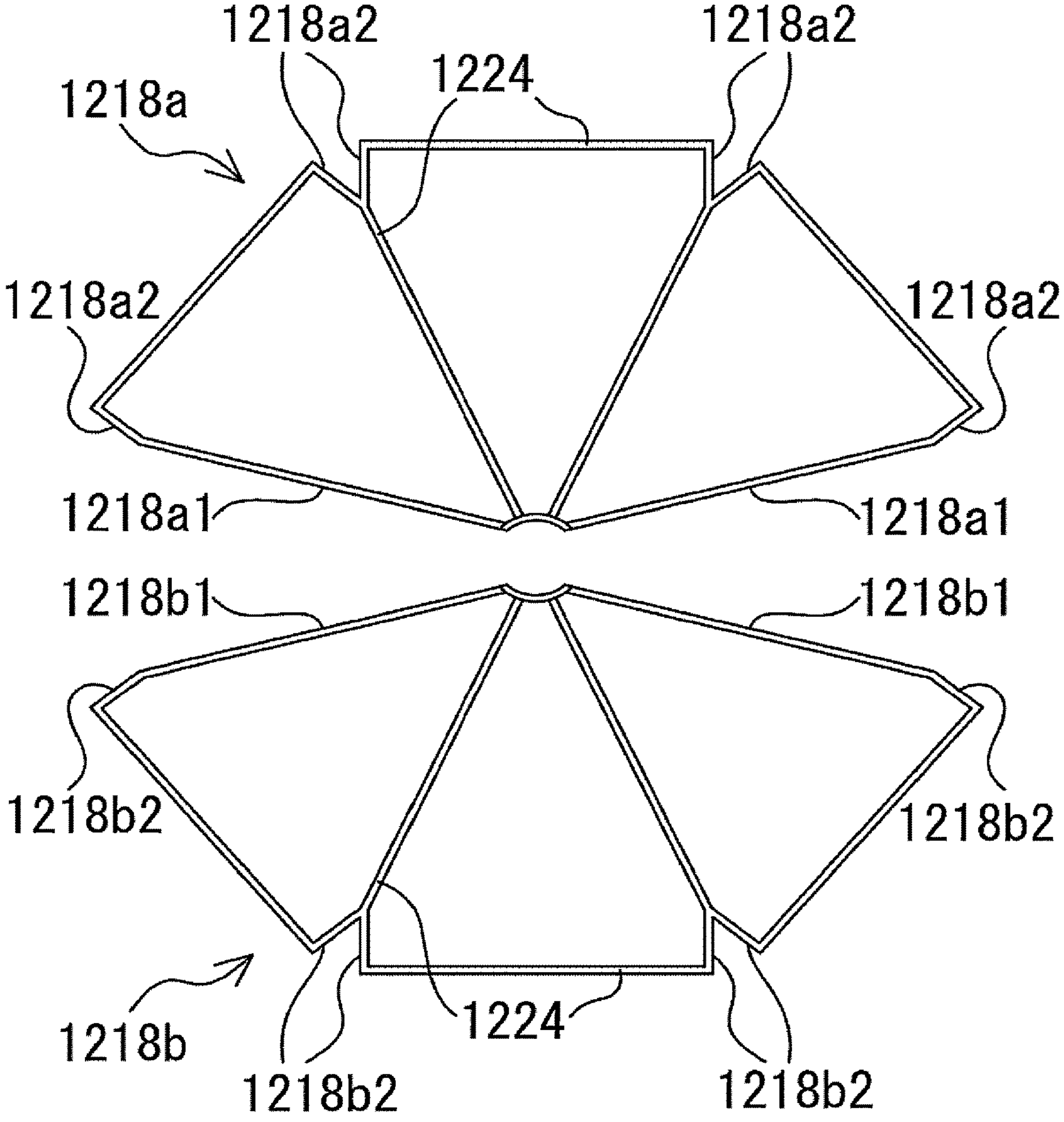
FIG. 21 is a plan view illustrating a gore that is a component of an umbrella body of the parachute of FIG. 20.
Figure 22:
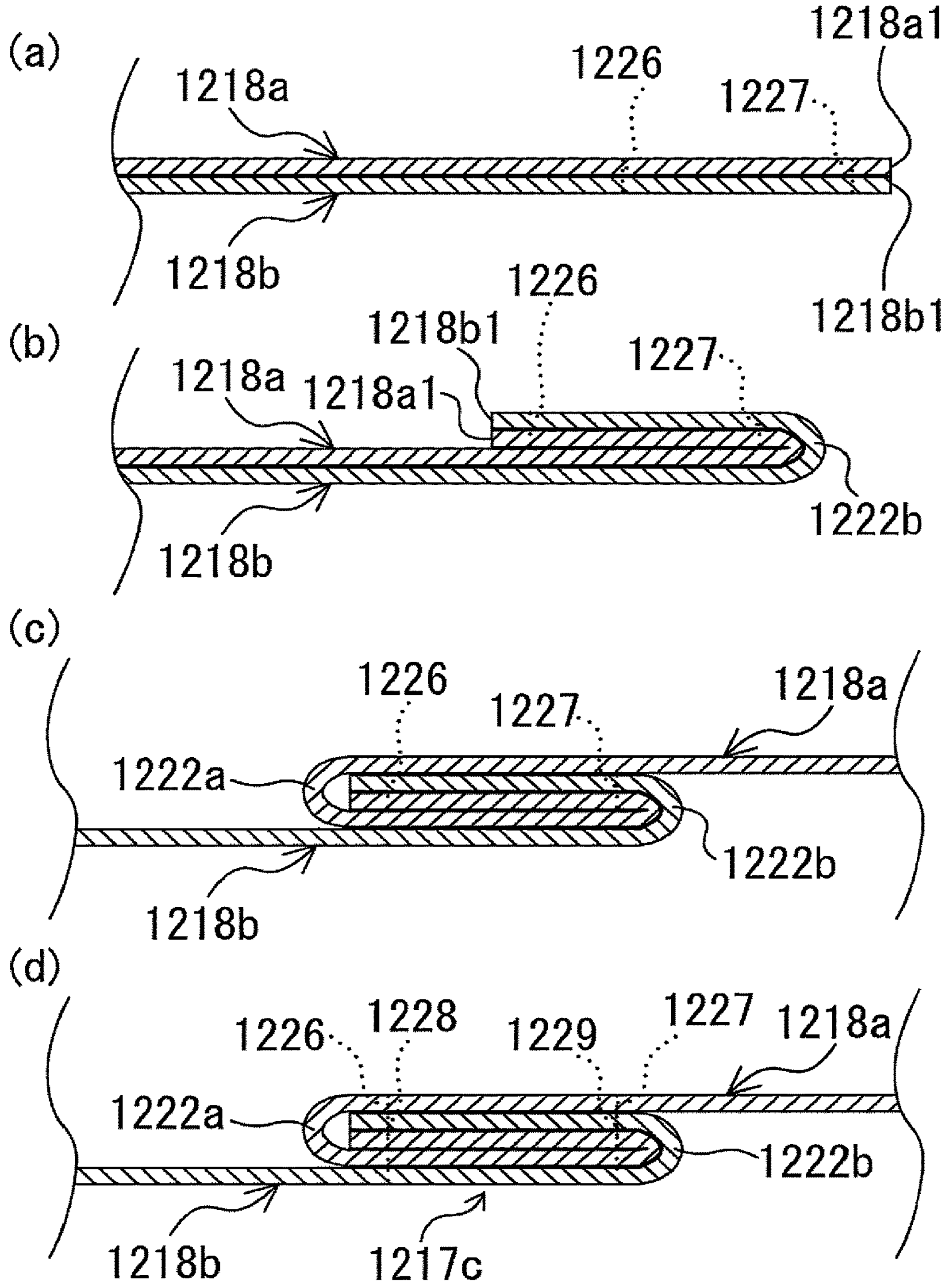
FIG. 22 is a process diagram explaining a connection step of a connection portion of the umbrella body of the parachute in FIG. 20.

Furthermore, as a modification of the second embodiment, a parachute 1200 illustrated in FIGS. 20 to 22 can also be exemplified. The parachute 1200 of the present modification is different from the parachute 500 of the second embodiment mainly in that the first fold portion 517*a*, the second fold portion 517*b*, and the connection portion 517*c* in the parachute of the second embodiment are a connection portion 1217*a*, a connection portion 1217*b* (first fixation portion), and a connection portion 1217*c* (second fixation portion). Hereinafter, the parachute 1200 will be described focusing on differences from the parachute 500 of the second embodiment. Note that, in the present modification, reference signs having the same numbers in the last two digits as those of the second embodiment are similar, and thus the description thereof may be omitted. Furthermore, portions that are not particularly described are similar to those of the first or second embodiment, and thus description and illustration thereof may be omitted.

The connection portions 1217*a*, 1217*b*, and 1217*c* are different from the first fold portion 517*a*, the second fold portion 517*b*, and the connection portion 517*c* in this order in the parachute 500 of the second embodiment in the connection method and the connection structure.

As illustrated in FIG. 20, the connection portion 1217*a* is formed in a portion (including a portion where the lateral side portions 1218*a*2 and 1218*a*2 are overlapped (see FIG. 21)) from the umbrella edge portion 1215 of the umbrella body 1211 to a position on the way to the umbrella top portion 1214. Furthermore, as illustrated in FIG. 20, the connection portion 1217*b* is formed in a portion (including a portion where the lateral side portions 1218*a*2 and 1218*b*2 are overlapped (see FIG. 21)) from the umbrella edge portion 1215 of the umbrella body 1211 to a position on the way to the umbrella top portion 1214. Furthermore, as illustrated in FIG. 20, the connection portion 1217*c* is formed in a portion (including a portion where the lateral side portions 1218*a*1 and 1218*b*1 are overlapped (see FIG. 21)) from a portion from the umbrella edge portion 1215 up to a position on the way to the umbrella top portion 1214 to the umbrella top portion 1214.

Note that the opening of the umbrella body 1211 is formed such that a portion (portion including connection portions 1217*a* and 1217*b*) from the umbrella edge portion 1215 to a position on the way to the umbrella top portion 1214 is inclined inward in the radial direction of the umbrella body 1211 in a case where the umbrella body 1211 is opened with respect to a portion (a portion including the connection portion 1217*c*) from the position on the way to the umbrella top portion 1214 to the umbrella top portion 1214 so as to form a recessed shape, that is, a three-dimensional extended skirt shape.

Hereinafter, a connection step of the connection portion 1217*c* will be described. Note that the step of connecting the connection portions 1217*a* and 1217*b* is substantially the same as the step of connecting the connection portion 1217*c*, and thus the description thereof will be omitted. First, two gores 1218*a* and 1218*b* having the same shape are cut out from a sheet (cloth or the like) for parachute, and then a reinforcement tape 1224 is attached to an end of each gore to reinforce the end (see FIG. 21). Next, the gores 1218*a* and 1218*b* are overlapped so that the positions of the lateral side portions 1218*a*1 and 1218*b*1 of the gores 1218*a* and 1218*b* coincide with each other (see FIG. 22(*a*)). Thereafter, the gores 1218*a* and 1218*b* is sewn and fixed using yarns 1226 and 1227. Note that this fixing may be performed using another fixing method such as welding or an adhesive. Subsequently, the lateral side portions 1218*a*1 and 1218*b*1 of the gores 1218*a* and 1218*b* are folded back in the circumferential direction of the umbrella body 1211 so that the gore 1218*a* is on the inner side to form a back surface-side fold-back portion 1222*b* (see FIG. 22(*b*)). At this time, since the gores 1218*a* and 1218*b* has already been sewn and fixed using the yarns 1226 and 1227, the gores 1218*a* and 1218*b* is less likely to be displaced. Subsequently, only the gore 1218*a* is folded back in a direction opposite to the folding direction in which the back surface-side fold-back portion 1222*b* is formed, and a front surface-side fold-back portion 1222*a* is formed while the gore 1218*a* overlaps the back surface-side fold-back portion 1222*b* (see FIG. 22(*c*)). Then, the gores 1218*a* and 1218*b* are entirely sewn and fixed again using a yarn 1228 at a position corresponding to the sewing position of the yarn 1226 (see FIG. 22(*d*)). Similarly, the gores 1218*a* and 1218*b* are again sewn and fixed using a yarn 1229 at a position corresponding to the sewing position of the yarn 1227 (see FIG. 22(*d*)). As a result, the five-layer connection portion 1217*c* is formed.

The reinforcement tape 1224 is a reinforcement member that is appropriately provided in a portion requiring reinforcement, such as a portion to which a load is applied by a line (not illustrated) connected to the annular member 1225. The annular member 1225 has an annular portion such that a cow-hitch can be attached to a line (not illustrated), and a part thereof is fixed to the connection portions 1217*a* and 1217*b* by sewing or an adhesive.

According to such a parachute 1200, when the connection portions 1217*a* and 1217*b*, and 1217*c* of the gore 1218*a* and 1218*b* are formed, the gore can be sewn so as not to be displaced from each other. That is, since the parachute 1200 can be easily manufactured, the manufacturing cost can be suppressed as compared with other parachutes.

REFERENCE SIGNS LIST

11, 511, 611, 711, 811, 1111, 1211 umbrella body
12, 512, 612, 712, 812, 912, 1112, 1124 line
13, 513, 613, 713, 813, 1113 center cord
14, 514, 614, 714, 814, 1114, 1214 umbrella top portion
15, 515, 615, 715, 815, 1115, 1215 umbrella edge portion
15*a*, 515*a*, 1115*a*, 1215*a* opening end
16, 516, 616, 716, 816, 1116, 1216 vent

17, 617, 717, 817, 917, 1117 fold portion
18, 518, 518*a*, 518*b*, 1218*a*, 1218*b* gore
19*a*, 519*a*, 522*a*, 1119*a*, 1222*a* front surface-side fold-back portion
19*b*, 519*b*, 522*b*, 1119*b*, 1222*b* back surface-side fold-back portion
20, 21, 520, 521, 1226, 1227, 1228, 1229 yarn
100, 500, 600, 700, 800, 1100, 1200 parachute
200 safety device
201 container
202 ejection device
203 gas generator
204 recess
205 piston head
206 piston
207 lid
300 flight vehicle
301 airframe
302 propulsion mechanism
303 leg
400 abnormality detection device
401 storage unit
402 flight control unit
403 information unit
410 sensor
420 control unit
421 abnormality detection unit
422 calculation unit
423 notification unit
517*a* first fold portion
517*b* second fold portion
517*c*, 1217*a*, 1217*b*, 1217*c* connection portion
523*a*, 523*b*, 1218*a*1, 1218*a*2, 1218*b*1, 1218*b*2 lateral side portion
630, 730, 830, 1130 bag-shaped member
631, 731, 831, 1131 intake port
640, 740, 840, 1140 check valve
641, 1141 hinge portion
642, 1142 plate member
743, 843 net member
744 truncated cone portion
845 inverted truncated cone portion
846 ball
950 cow-hitch portion
951 annular portion
952 hole
1000 impact-absorbing seat
1001 seat
1002 impact absorbing mechanism
1003 damper member
1004 spring member
1118*a*1 lower-side gore
1118*a*2 lower-side gore
1125 ventilation portion
1224 reinforcement tape
1225 annular member

The invention claimed is:

1. A parachute comprising:

an umbrella body including an umbrella top portion and an umbrella edge portion; and a plurality of lines each including one end connected to the umbrella body, wherein the umbrella body is formed of one or more gores, and at least one first fold portion formed with layers by folding and fixing the umbrella body along a circumferential direction from the umbrella edge portion to a position closer to the umbrella top portion than the umbrella edge portion to form an odd number of layers in the circumferential direction of the umbrella body.

2. The parachute according to claim 1, wherein an end of a line of the plurality of lines is connected to the fold portion.

3. The parachute according to claim 1, wherein a number of the one or more gores is less than a number of the plurality of lines.

4. The parachute according to claim 1, wherein a vent opened at a time of deployment is formed in the umbrella top portion, and a bag-shaped member including an intake port that takes in air through the vent is disposed on an outer side of the vent.

5. The parachute according to claim 4, further comprising a center cord including one end branched into a plurality of portions and connected to an edge portion of the vent.

6. A safety device comprising:

the parachute according to claim 1;

a container that accommodates the parachute; and an ejection device that is disposed in the container and ejects the parachute to an outside of the container.

7. The safety device according to claim 6, wherein the safety device is attachable to a flight vehicle, and the safety device further comprises an abnormality detection device capable of detecting an abnormality of the flight vehicle or a surrounding environment, wherein the abnormality detection device activates the ejection device when detecting the abnormality.

8. The safety device according to claim 7, further comprising flight control circuitry configured to stop propulsion by a propulsion device disposed in the flight vehicle when the abnormality detection device detects the abnormality.

9. A flight vehicle comprising:

an airframe;

the safety device according to claim 6, the safety device being disposed in the airframe; and one or more propulsion mechanisms coupled to the airframe to propel the airframe.

10. A parachute comprising:

an umbrella body including an umbrella top portion and an umbrella edge portion; and a plurality of lines each including one end connected to the umbrella body, wherein the umbrella body is formed by connecting lateral side portions of a plurality of gores, at least one connection portion between a first gore of the plurality of gores and a second gore of the plurality of gores adjacent to the first gore includes a fold portion formed with layers by fixing in a meshed state, and wherein the connection portion includes a first hook-shaped portion formed by folding back a portion of a lateral side portion of the first gore from the umbrella edge portion to a position approaching the umbrella top portion in a circumferential direction of the umbrella body; and a second hook-shaped portion formed by folding back a portion of a lateral side portion of the second gore that corresponds to the first hook-shaped portion in a direction opposite to a folding back direction of the first gore along the circumferential direction of the umbrella body.

11. A parachute comprising:

an umbrella body including an umbrella top portion and an umbrella edge portion; and a plurality of lines including one ends connected to the umbrella body, wherein the umbrella body is formed by connecting lateral side portions of a plurality of gores, at least one connection portion between a first gore of the plurality of gores and a second gore of the plurality of gores adjacent to adjacent to the first gore:

a first fixation portion formed by folding back the first gore and the second gore to form a fold-back portion in a state where the first gore and the second gore are overlapped, wherein a side portion of each lateral side portion of the first gore and the second gore from the umbrella edge portion to the umbrella top portion is fixed, and by fixing the first gore and the second gore after folding back only the first gore or the second gore in a direction opposite to a folding back direction of the fold-back portion to overlap the fold-back portion; and/or a second fixation portion formed by folding back the first gore and the second gore to form a fold-back portion in a state where the first gore and the second gore are overlapped and a side portion of each lateral side portion of the first gore and the second gore is fixed from the umbrella edge portion to the umbrella top portion, and by fixing the first gore corresponding to a position of the fold-back portion and the second gore after folding back only the first gore or the second gore in a direction opposite to a folding back direction of the fold-back portion to overlap the fold-back portion, and the fold-back portion from the umbrella edge portion to the umbrella top portion is formed to be inclined inward in a radial direction of the umbrella body when the umbrella body is opened so that an opening portion on a side of the lines of the umbrella body has a narrowed shape.

* * * * *